[12] United States Patent
Van der Auwera et al.

(10) Patent No.: US 9,282,344 B2
(45) Date of Patent: Mar. 8, 2016

(54) SECONDARY BOUNDARY FILTERING FOR VIDEO CODING

(71) Applicant: Qualcomm Incorporated, San Diego, CA (US)

(72) Inventors: Geert Van der Auwera, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 481 days.

(21) Appl. No.: 13/666,610

(22) Filed: Nov. 1, 2012

(65) Prior Publication Data

US 2013/0114708 A1    May 9, 2013

Related U.S. Application Data

(60) Provisional application No. 61/556,038, filed on Nov. 4, 2011.

(51) Int. Cl.
*H04N 7/12* (2006.01)
*G06F 13/00* (2006.01)
(Continued)

(52) U.S. Cl.
CPC ............. *H04N 19/82* (2014.11); *H04N 19/117* (2014.11); *H04N 19/136* (2014.11); *H04N 19/176* (2014.11); *H04N 19/593* (2014.11)

(58) Field of Classification Search
CPC .................. H04N 19/00763; H04N 19/00303; H04N 19/00951; H04N 19/0089
USPC .............................................. 375/240.01–29
See application file for complete search history.

(56) References Cited

U.S. PATENT DOCUMENTS 6,690,838 B2 *    2/2004    Zhou ......................... G06T 9/00
                                                                  382/199
2005/0117653 A1    6/2005    Sankaran
(Continued)

FOREIGN PATENT DOCUMENTS

KR    20080090937 A    10/2008
WO    2011126349 A2    10/2011
WO    2011134641 A1    11/2011

OTHER PUBLICATIONS

Bross et. al. ("WD4: WorlJng Draft 4 or High-Effidency Video Coding" (JCT-VC)ofITU-T SG16 WP3 and ISOIIEC JTCIISC29IWGII 6th Meeting: Torino, IT, Jul. 14-22, 2011).*

(Continued)

*Primary Examiner* — Dave Czekaj
*Assistant Examiner* — Tsion B Owens
(74) *Attorney, Agent, or Firm* — Shumaker & Sieffert, P.A.

(57)    ABSTRACT

In one example, a video coding device is configured to intra-predict a block of video data, using values of pixels along a primary boundary of the block, to form a predicted block, determine whether to filter the predicted block using data of a secondary boundary of the block, and filter the predicted block using data of the secondary boundary in response to determining to filter the predicted block. The video coding device may determine whether to filter the predicted block based on a comparison of a Laplacian value or a gradient difference value to a threshold. The determination of whether to filter the predicted block may be based at least in part on a boundary relationship, e.g., the relationship of one boundary to another, or of a boundary to pixel values of the predicted block.

37 Claims, 8 Drawing Sheets

(51) Int. Cl.

| | |
|---|---|
| H04N 19/82 | (2014.01) |
| H04N 19/176 | (2014.01) |
| H04N 19/593 | (2014.01) |
| H04N 19/117 | (2014.01) |
| H04N 19/136 | (2014.01) |

(56) References Cited

U.S. PATENT DOCUMENTS

| | | | | |
|---|---|---|---|---|
| 2008/0247464 | A1* | 10/2008 | Seregin | H04N 19/176 375/240.12 |
| 2009/0116546 | A1 | 5/2009 | Park et al. | |
| 2010/0266211 | A1* | 10/2010 | Vandame | G06T 5/20 382/199 |
| 2010/0329362 | A1 | 12/2010 | Choi et al. | |
| 2011/0194614 | A1 | 8/2011 | Norkin et al. | |
| 2011/0200100 | A1* | 8/2011 | Kim | H04N 19/176 375/240.02 |
| 2011/0222607 | A1 | 9/2011 | An et al. | |
| 2012/0106641 | A1* | 5/2012 | Francois | H04N 19/105 375/240.16 |
| 2013/0022112 | A1* | 1/2013 | Lim | H04N 19/0009 375/240.12 |
| 2013/0034158 | A1* | 2/2013 | Kirchhoffer | H04N 19/159 375/240.12 |
| 2013/0101031 | A1* | 4/2013 | Van der Auwera | H04N 19/14 375/240.12 |

OTHER PUBLICATIONS

Bross, et al., "WD4: Working Draft 4 of High-Efficiency Video Coding", JCT-VC Meeting; MPEG Meeting; Jul. 14, 2011-Jul. 22, 2011; Torino; (Joint Collaborative Team on Video Coding of ISO/IEC JTC1/SC29/WG11 and ITU-T Sg.16) ; URL: http://wftp3.itu.int/av-arch/jctvc-site/, No. JCTVC-F803, 216 pp.

Bross, et al., "High efficiency video coding (HEVC) text specification draft 6," JCTVC-H1003, Joint Collaborative Team on Video Coding (JCT-VC) of ITU-T SG16 WP3 and ISO/IEC JTC1/SC29/WG11, 8th Meeting: San José, CA, USA, Feb. 1-10, 2012, 259 pp.

International Search Report and Written Opinion—PCT/US2012/063276—ISA/EPO—Jan. 30, 2013.

Joshi , "BOG report on intra prediction complexity reduction and filtering, JCT-VC Meeting; MPEG Meeting; Nov. 21, 2011-Nov. 30, 2011; Geneva; (Joint Collaborative Team on Video Coding of ISO/IEC JTC1/SC29/WG11 and ITU-T SG.16 ); URL: http://wftp3.itu.int/av-arch/jctvc-site/ " No. JCTVC-G1032, XP030111016, 3 pp.

Narroschke et al., "Decisions for deblocking", 20110310, No. JCTVC-E251, Mar. 10, 2011, XP030008757, ISSN: 0000-0007, 11 pp.

Tabatabai et al., "CE6: Intra Coding Improvements", JCT-VC Meeting; MPEG Meeting; Jul. 14, 2011-Jul. 22, 2011; Torino; (Joint Collaborative Team on Video Coding of ISO/IEC JTC1/SC29/WG11 and ITU-T SG.16); URL: http://wftp3.itu.int/av-arch/jctvc-site/ No. JCTVC-F906, XP030009807, 10 pp.

"Text of ISO/IEC 14496-10:200X / FDIS Advanced Video Coding (4th edition)" MPEG Meeting;Feb. 6, 2007-Jun. 6, 2007; Lausanne; (Motion Picture Expert Group or ISO/IEC JTC1/SC29/WG11) No. N9198, XP030015692, 633 pp. [uploaded in parts].

Second Written Opinion from International Application No. PCT/US2012/063276, dated Oct. 7, 2013, 7 pp.

International Preliminary Report on Patentability from International Application No. PCT/US2012/063276, dated Feb. 3, 2014, 9 pp.

Bross et al., "High efficiency video coding (HEVC) text specification draft 9," 11th Meeting: Shanghai, CN, Oct. 10-19, 2012, JCTVC-K1003_v7, 290 pp.

Bross et al., "High efficiency video coding (HEVC) text specification draft 10 (for FDIS & Last Call)," 12th Meeting: Geneva, CH, Jan. 14-23, 2013, JCTVC-L1003_v34, 310 pp.

ITU-T H.265, Series H: Audiovisual and Multimedia Systems, Infrastructure of audiovisual services—Coding of moving video, Advanced video coding for generic audiovisual services, The International Telecommunication Union. Apr. 2013, 317 pp.

Wiegand et al.," WD1: Working Draft 1 of High-Efficiency Video Coding", Joint Collaborative Team on Video Coding, JCTVC-C403, Oct. 7-15, 2010, 137 pp.

Alshin et al., "Block-size and pixel position independent boundary smoothing for non-directional Intra prediction," Joint Collaborative Team on Video Coding, Document: JCTVC-F252, Jul. 14-22, 2011, 4 pp.

Bross et al., "High efficiency video coding (HEVC) text specification draft 6," Joint Collaborative Team on Video Coding, JCTVC-H1003, Nov. 21-30, 2011, 259 pp.

Bross et al., "High efficiency video coding (HEVC) text specification draft 7," Joint Collaborative Team on Video Coding, JCTVC-I1003_D2, Apr. 27-May 7, 2012, 290 pp.

Bross et al., "High efficiency video coding (HEVC) text specification draft 8," Joint Collaborative Team on Video Coding, JCTVC-J1003_D7, Jul. 11-20, 2012, 261 pp.

Bross et al., "WD4: Working Draft 4 of High-Efficiency Video Coding," Joint Collaborative Team on Video Coding, JCTVC-F803_d2, Jul. 14-22, 2011, 226 pp.

Bross et al., "WD5: Working Draft 5 of High-Efficiency Video Coding," Joint Collaborative Team on Video Coding, JCTVC-G1103_d2, Nov. 21-30, 2011, 214 pp.

Guo et al., "CE6 Subset d: Intra Prediction with Secondary Boundary," Joint Collaborative Team on Video Coding, Document: JCTVC-G280, Nov. 21-30, 2011, 7 pp.

Guo et al. "Direction based Angular Intra Prediction", Joint Collaborative Team on Video Coding, Document: JCTVC-F122, Jul. 14-22, 2011, 7 pp.

International Telecommunication Union, "Advanced video coding for generic audiovisual services," Standardization Sector of ITU, Jun. 2011, 674 pp.

Lainema et al., "CE6.d: Nokia report on intra prediction with secondary boundary," Joint Collaborative Team on Video Coding, Document: JCTVC-G565, Nov. 21-30, 2011, 5 pp.

Lainema et al., "Directional intra prediction smoothing", Joint Collaborative Team on Video Coding, Document: JCTVC-F456, Jul. 14-22, 2011, 7 pp.

Lee et al., "Mode dependent filtering for intra predicted sample", Joint Collaborative Team on Video Coding, Document: JCTVC-F358, Jul. 14-22, 2011, 9 pp.

Minezawa et al., "An improved intra vertical and horizontal prediction", Joint Collaborative Team on Video Coding, Document: JCTVC-F172, Jul. 14-22, 2011, 6 pp.

Sugimoto et al. "CE6.f: LUT-based adaptive filtering on intra prediction samples," Joint Collaborative Team on Video Coding, Document: JCTVC-E069, Mar. 16-23, 2011, 12 pp.

Tabatabai et al., "CE6: Intra Coding Improvements," Joint Collaborative Team on Video Coding, Document: JCTVC-F906_r2, Jul. 14-22, 2011, 12 pp.

Van Der Auwera et al., "Non-CE6.d: Intra Prediction With Selective Secondary Boundary," Joint Collaborative Team on Video Coding, Document: JCTVC-G139, Nov. 21-30, 2011, 5 pp.

Wiegand et al., "WD3: Working Draft 3 of High-Efficiency Video Coding," Joint Collaborative Team on Video Coding, JCTVC-E603, Mar. 16-23, 2011, 193 pp.

Wiegand et al., "WD2: Working Draft 2 of High-Efficiency Video Coding", Joint Collaborative Team on Video Coding, JCTVC-D503, Jan. 20-28, 2011, 153 pp.

\* cited by examiner

|     | 104A | 104B | 104C | 104D |
| --- | --- | --- | --- | --- |
| 102A | 106A (0, 0) | 106B | 106C | 106D (N, 0) |
| 102B | 106E | 106F | 106G | 106H |
| 102C | 106I | 106J | 106K | 106L |
| 102D | 106M (0, N) | 106N | 106O | 106P (N, N) |

FIG. 5A

|     | 114A | 114B | 114C | 114D |
| --- | --- | --- | --- | --- |
| 112A | 116A (0, 0) | 116B | 116C | 116D (N, 0) |
| 112B | 116E | 116F | 116G | 116H |
| 112C | 116I | 116J | 116K | 116L |
| 112D | 116M (0, N) | 116N | 116O | 116P (N, N) |

FIG. 5B

SECONDARY BOUNDARY FILTERING FOR VIDEO CODING

This application claims the benefit of U.S. Provisional Application Ser. No. 61/556,038, filed Nov. 4, 2011, the entire contents of which are hereby incorporated by reference.

TECHNICAL FIELD

This disclosure relates to video coding, and more particularly, intra-prediction coding of video data.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2, MPEG-4, ITU-T H.263 or ITU-T H.264/ MPEG-4, Part 10, Advanced Video Coding (AVC), and extensions of such standards, to transmit and receive digital video information more efficiently.

Video compression techniques perform spatial prediction and/or temporal prediction to reduce or remove redundancy inherent in video sequences. For block-based video coding, a video frame or slice may be partitioned into blocks. Each block can be further partitioned. Blocks in an intra-coded (I) frame or slice are encoded using spatial prediction with respect to neighboring blocks. Blocks in an inter-coded (P or B) frame or slice may use spatial prediction with respect to neighboring blocks in the same frame or slice or temporal prediction with respect to other reference frames.

SUMMARY

In general, this disclosure describes techniques for determining whether to perform secondary boundary filtering during intra-prediction coding of video data. The decision of whether to perform secondary boundary filtering may be based on mathematical boundary relationships, e.g., relationships between boundaries of a current block or a boundary of a current block and pixel values of the current block. The mathematical boundary relationships may correspond to Laplacian values or gradient differences, in some examples.

In one example, a method includes intra-predicting a block of video data, using values of pixels along a primary boundary of the block, to form a predicted block, determining whether to filter the predicted block using data of a secondary boundary of the block, and filtering the predicted block using data of the secondary boundary in response to determining to filter the predicted block.

In another example, a device includes a video coder configured to intra-predict a block of video data, using values of pixels along a primary boundary of the block, to form a predicted block, determine whether to filter the predicted block using data of a secondary boundary of the block, and filter the predicted block using data of the secondary boundary in response to determining to filter the predicted block.

In another example, a device includes means for intra-predicting a block of video data, using values of pixels along a primary boundary of the block, to form a predicted block, means for determining whether to filter the predicted block using data of a secondary boundary of the block, and means for filtering the predicted block using data of the secondary boundary in response to determining to filter the predicted block.

In another example, a computer-readable storage medium has stored thereon instructions that, when executed, cause a processor to intra-predict a block of video data, using values of pixels along a primary boundary of the block, to form a predicted block, determine whether to filter the predicted block using data of a secondary boundary of the block, and filter the predicted block using data of the secondary boundary in response to determining to filter the predicted block.

The details of one or more examples are set forth in the accompanying drawings and the description below. Other features, objects, and advantages will be apparent from the description and drawings, and from the claims.

BRIEF DESCRIPTION OF DRAWINGS

FIGS. 5A and 5B are conceptual diagrams illustrating computing of boundary relationships between reference boundary samples based on Laplacians.

DETAILED DESCRIPTION

Figure 1:
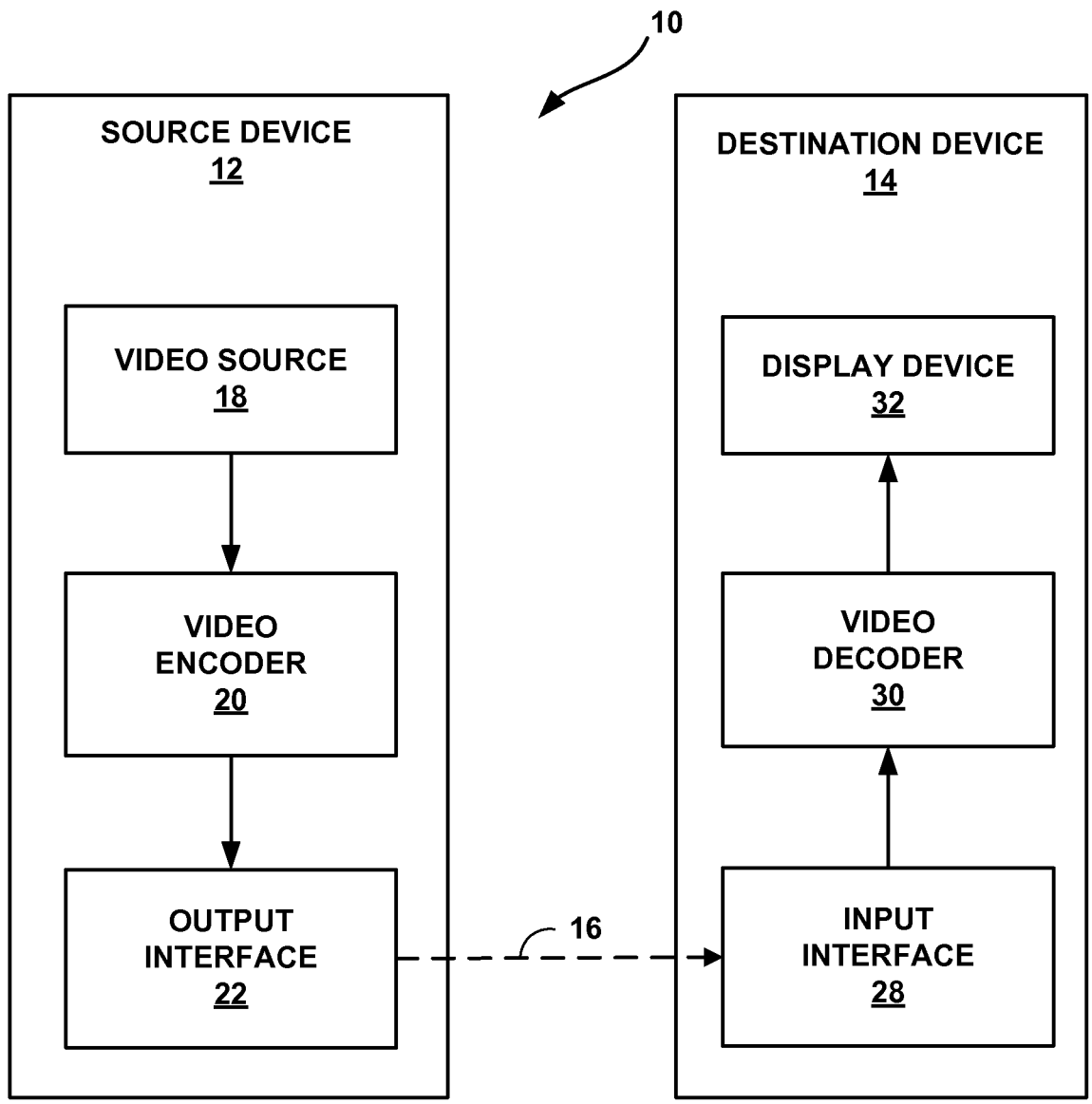
FIG. 1 is a block diagram illustrating an example video encoding and decoding system that may utilize techniques for determining whether to perform secondary boundary filtering.

In general, this disclosure provides techniques related to processing pixels during intra-prediction coding. In particular, this disclosure describes techniques for enabling or disabling (fully or partially) secondary boundary filtering during intra-prediction coding of blocks of video data. Secondary boundary filtering may also be described as filtering a predicted block, which was predicted using data of a primary boundary, using data of a secondary boundary. That is, intra-predicting a block may include predicting the block using data of a primary boundary, determining whether to filter the block using a secondary boundary, and then filtering the predicted block using data of the secondary boundary in response to determining to filter the block.

Secondary boundary filtering may include applying any of a variety of filters to values of pixels at a secondary boundary and values of pixels in the prediction unit to produce modified values of pixels in the prediction unit. Secondary boundary filtering may generally include calculating offset values for one or more pixels of a predicted block using one or more values of the secondary boundary and applying the offset values to the respective pixels.

The boundaries may correspond to a left-side boundary or an above boundary (that is, a top-side boundary). A prediction unit may be generated through various intra-prediction modes, such as directional intra-prediction modes and non-directional intra-prediction modes. The non-directional intra-prediction modes may include, for example, DC mode and planar mode. The directional intra-prediction modes may include, as described in this disclosure, relatively horizontal intra-prediction modes, relatively vertical intra-prediction modes, and relatively diagonal intra-prediction modes. Relatively horizontal intra-prediction modes are used to generate a predicted block using data of the left-side boundary, while the relatively vertical intra-prediction modes are used to generate a predicted block using data of the top-side boundary.

Accordingly, the primary boundary, as described above, may be considered the left-side boundary when the predicted block is generated using a relatively horizontal intra-prediction mode, whereas the primary boundary may be considered the top-side boundary when the predicted block is generated using a relatively vertical intra-prediction mode. The secondary boundary may be considered the top-side boundary when the predicted block is generated using a relatively horizontal intra-prediction mode, whereas the secondary boundary may be considered the left-side boundary when the predicted block is generated using a relatively vertical intra-prediction mode.

Video blocks may include coding units (CUs), prediction units (PUs), and transform units (TUs). Block boundaries may occur between CUs, PUs, and TUs. That is, a block boundary may correspond to a common edge between two neighboring blocks, e.g., neighboring CUs, PUs, or TUs. CUs generally refer to blocks of video data that include one or more PUs and one or more TUs. PUs generally correspond to blocks of predicted data, whether by intra-prediction or inter-prediction, while TUs correspond to blocks of residual data. Residual data generally corresponds to pixel-by-pixel differences between raw, uncoded video data and predicted video data, that is, values of pixels in a corresponding PU. The HEVC Working Draft version 4 (WD4) specifies the following intra prediction modes for the luma component: planar, DC, and up to 33 directional modes, depending on the intra PU size. HEVC WD4 is described in Bross et al., WD4: Working Draft 4 of High Efficiency Video Coding, Joint Collaborative Team on Video Coding (JCT-VC) of ITU-T SG16 WP3 and ISO/IEC JTC1/SC29/WG11, 6$^{th}$ Meeting, Torino, IT, 14-22 Jul., 2011. The Mode-Dependent Intra Smoothing (MDIS) method includes low-pass filtering of the reference boundary samples before intra prediction, depending on the mode and PU size. The DC prediction filtering method and simplification apply filtering across the boundary of the DC-predicted PU.

Some techniques for processing pixels near boundaries between intra-predicted blocks (that is, intra-predicted PUs, also referred to herein as "predicted blocks") include filtering, gradient-based prediction, and bi-directional prediction. In gradient-based prediction, the difference between two reference boundary samples may be computed (in some cases, interpolation may be required), weighted, and added to at least one column or row along the intra PU boundary, depending on horizontal or vertical prediction. In bi-directional prediction, the reference samples (that is, pixels) on both ends of the direction may be used (in some cases, interpolation may be required), and the reference sample on the secondary boundary may be weighted and added to the predicted intra PU samples. In other words, following the generation of a predicted block, e.g., using data of a primary boundary, a video coder may apply a filter that mathematically combines data (e.g., pixel values) of the predicted block with values of a secondary boundary to modify the data of the predicted block.

In some examples, a weighted gradient between two reference samples may be added to at least one column or row along the intra PU boundary for vertical and horizontal prediction modes. In some examples, a filter is applied across the boundary of a PU generated according to a planar prediction mode, and a two-tap filter may be applied to the secondary boundary, depending on the intra prediction direction. In some examples, a diagonal two-tap filter may be applied across the secondary boundary depending on the intra-prediction direction, without necessarily applying the first filter across the boundary of a PU generated according to a planar prediction mode.

Evaluation of video coding methods typically includes evaluation of reduction in Bjontegaard Delta bitrate (BD-rate). Such evaluation includes a comparison of bitrate (that is, the number of bits used to represent video data) to distortion (that is, the difference between data that can be reproduced from the coded video data and the original video data). In general, techniques that reduce the BD-rate reflect favorable video coding techniques. The methods for boundary filtering discussed above reduce the BD-rate for some video sequences, but in some cases, the secondary boundary filtering introduces unfavorable BD-rate losses. This disclosure provides techniques for protecting against applying secondary boundary filtering for cases where BD-rate losses are introduced.

More particularly, this disclosure provides techniques for detecting the cases that result in BD-rate losses for secondary boundary filtering. These techniques may be described as protection logic for the secondary boundary filtering, in that these techniques may determine whether to enable or disable (wholly or partially) secondary boundary filtering. If the detection is positive, the secondary boundary filtering may be partially or entirely disabled, in order to improve BD-rate performance. For example, for sequences that include text regions that have high contrast and contain frequent transitions, secondary boundary filtering propagates unrelated samples from the reference boundary into the intra PU.

The techniques of this disclosure include computing mathematical relationships between the samples of the reference boundaries or between a reference boundary sample and the intra PU samples (that is, pixel values of the predicted block). These mathematical relationships can be based on the computation of, for example, Laplacians or gradient differences. The results from computing these relationships can be compared against thresholds in order to decide between applying or disabling (partially or entirely) secondary boundary filtering. The thresholds can be predetermined constants (potentially depending on parameters such as the quantization parameter) that are computed while encoding/decoding, or signaled. The mathematical relationships can be computed by both the encoder and decoder, or only by the encoder, in which case the encoder may signal to the decoder whether secondary boundary filtering should be applied, or what part should be applied.

FIG. 1 is a block diagram illustrating an example video encoding and decoding system 10 that may utilize techniques for determining whether to perform secondary boundary filtering. As shown in FIG. 1, system 10 includes a source device 12 that provides encoded video to a destination device 14 via a computer-readable medium 16. Source device 12 and destination device 14 may comprise any of a wide range of devices. The techniques of this disclosure may apply to over-the-air television broadcasts, cable television transmissions, satellite television transmissions, Internet video transmissions, encoded digital video that is encoded onto a storage medium, or other scenarios. Accordingly, computer-readable medium 16 may comprise any combination of wireless or wired media suitable for transmission of encoded video data, or computer-readable storage media such as discs, hard drives, or the like.

In the example of FIG. 1, source device 12 includes video source 18, video encoder 20, and output interface 22. Destination device 14 includes input interface 28, video decoder 30, and display device 32. In accordance with this disclosure, video encoder 20 of source device 12 may be configured to apply the techniques for determining whether to perform secondary boundary filtering. In other examples, a source device and a destination device may include other components or arrangements. For example, source device 12 may receive video data from an external video source 18, such as an external camera. Likewise, destination device 14 may interface with an external display device, rather than including an integrated display device.

The illustrated system 10 of FIG. 1 is merely one example. Techniques for determining whether to perform secondary boundary filtering may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device 12 and destination device 14 are merely examples of such coding devices in which source device 12 generates coded video data for transmission to destination device 14. In some examples, devices 12, 14 may operate in a substantially symmetrical manner such that each of devices 12, 14 include video encoding and decoding components. Hence, system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed from a video content provider. As a further alternative, video source 18 may generate computer graphics-based data as the source video, or a combination of live video, archived video, and computer-generated video. In some cases, if video source 18 is a video camera, source device 12 and destination device 14 may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by video encoder 20. The encoded video information may then be output by output interface 22 onto a computer-readable medium 16.

Computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

Input interface 28 of destination device 14 receives information from computer-readable medium 16. The information of computer-readable medium 16 may include syntax information defined by video encoder 20, which is also used by video decoder 30, that includes syntax elements that describe characteristics and/or processing of blocks and other coded units, e.g., GOPs. Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

In the example of FIG. 1, computer-readable medium 16 may comprise any wireless or wired communication medium, such as a radio frequency (RF) spectrum or one or more physical transmission lines, or any combination of wireless and wired media. Computer-readable medium 16 may form part of a packet-based network, such as a local area network, a wide-area network, or a global network such as the Internet. Computer-readable medium 16 generally represents any suitable communication medium, or collection of different communication media, for transmitting video data from source device 12 to destination device 14, including any suitable combination of wired or wireless media. Computer-readable medium 16 may include routers, switches, base stations, or any other equipment that may be useful to facilitate communication from source device 12 to destination device 14.

Video encoder 20 and video decoder 30 may operate according to a video compression standard, such as the ITU-T H.264 standard, alternatively referred to as MPEG-4, Part 10, Advanced Video Coding (AVC). The techniques of this disclosure, however, are not limited to any particular coding standard. Other examples include MPEG-2 and ITU-T H.263. Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

The ITU-T H.264/MPEG-4 (AVC) standard was formulated by the ITU-T Video Coding Experts Group (VCEG) together with the ISO/IEC Moving Picture Experts Group (MPEG) as the product of a collective partnership known as the Joint Video Team (JVT). In some aspects, the techniques described in this disclosure may be applied to devices that generally conform to the H.264 standard. The H.264 standard is described in ITU-T Recommendation H.264, Advanced Video Coding for generic audiovisual services, by the ITU-T Study Group, and dated March, 2005, which may be referred to herein as the H.264 standard or H.264 specification, or the H.264/AVC standard or specification. The Joint Video Team (JVT) continues to work on extensions to H.264/MPEG-4 AVC.

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. Each of video encoder 20 and video decoder 30 may be included in one or more encoders or decoders, either of which may be integrated as part of a combined encoder/decoder (CODEC) in a respective camera, computer, mobile device, subscriber device, broadcast device, set-top box, server, or the like.

A video sequence typically includes a series of video frames. A group of pictures (GOP) generally comprises a series of one or more video frames. A GOP may include syntax data in a header of the GOP, a header of one or more frames of the GOP, or elsewhere, that describes a number of frames included in the GOP. Each frame may include frame syntax data that describes an encoding mode for the respective frame. Video encoder 20 typically operates on video blocks within individual video frames in order to encode the video data. A video block may correspond to a block or a partition of a block. The video blocks may have fixed or varying sizes, and may differ in size according to a specified coding standard. Each video frame may include a plurality of slices. Each slice may include a plurality of blocks, which may be arranged into partitions, also referred to as subblocks.

As an example, the ITU-T H.264 standard supports intra prediction in various block sizes, such as 16 by 16, 8 by 8, or 4 by 4 for luma components, and 8×8 for chroma components, as well as inter prediction in various block sizes, such as 16×16, 16×8, 8×16, 8×8, 8×4, 4×8 and 4×4 for luma components and corresponding scaled sizes for chroma components. In this disclosure, "N×N" and "N by N" may be used interchangeably to refer to the pixel dimensions of the block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a nonnegative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

Block sizes that are less than 16 by 16 may be referred to as partitions of a 16 by 16 block. Video blocks may comprise blocks of pixel data in the pixel domain, or blocks of transform coefficients in the transform domain, e.g., following application of a transform such as a discrete cosine transform (DCT), an integer transform, a wavelet transform, or a conceptually similar transform to the residual video block data representing pixel differences between coded video blocks and predictive video blocks. In some cases, a video block may comprise blocks of quantized transform coefficients in the transform domain.

Smaller video blocks can provide better resolution, and may be used for locations of a video frame that include high levels of detail. In general, blocks and the various partitions, sometimes referred to as sub-blocks, may be considered video blocks. In addition, a slice may be considered to be a plurality of video blocks, such as blocks and/or sub-blocks. Each slice may be an independently decodable unit of a video frame. Alternatively, frames themselves may be decodable units, or other portions of a frame may be defined as decodable units. The term "coded unit" or "coding unit" may refer to any independently decodable unit of a video frame such as an entire frame, a slice of a frame, a group of pictures (GOP) also referred to as a sequence, or another independently decodable unit defined according to applicable coding techniques.

Encoded video data may include prediction data and residual data. A video encoder may produce the prediction data during an intra-prediction mode or an inter-prediction mode. Intra-prediction generally involves predicting a block of a picture relative to neighboring, previously coded blocks of the same picture. Inter-prediction generally involves predicting a block of a picture relative to data of a previously coded picture.

Following intra- or inter-prediction, a video encoder may calculate a residual value for the block. The residual value generally corresponds to the difference between the predicted data for the block and the true value of the block. To further compress the residual value of a block, the residual value may be transformed into a set of transform coefficients that compact as much data (also referred to as "energy") as possible into as few coefficients as possible. The transform coefficients correspond to a two-dimensional matrix of coefficients that may be the same size as the original block. In other words, there may be as many transform coefficients as pixels in the original block. However, due to the transform, many of the transform coefficients may have values equal to zero.

The video encoder may then quantize the transform coefficients to further compress the video data. Quantization generally involves mapping values within a relatively large range to values in a relatively small range, thus reducing the amount of data needed to represent the quantized transform coefficients. The quantization process may reduce the bit depth associated with some or all of the coefficients. For example, an n-bit value may be rounded down to an m-bit value during quantization, where n is greater than m. Following quantization, the video encoder may scan the transform coefficients, producing a one-dimensional vector from the two-dimensional matrix including the quantized transform coefficients. Because there may be several zero-value quantized transform coefficients, the video encoder may be configured to stop the scan upon reaching a zero-valued quantized transform coefficient, thus reducing the number of coefficients in the one-dimensional vector. The scan may be designed to place higher energy (and therefore lower frequency) coefficients at the front of the array and to place lower energy (and therefore higher frequency) coefficients at the back of the array.

The video encoder may then entropy encode the resulting array, to even further compress the data. In some examples, the video encoder may be configured to use variable length codes (VLCs) to represent various possible quantized transform coefficients of the array, e.g., using context-adaptive variable-length coding (CAVLC). In other examples, the video encoder may be configured to use binary arithmetic coding to encode the resulting quantized coefficients, e.g., using context-adaptive binary arithmetic coding (CABAC).

Video encoder 20 may further send syntax data, such as block-based syntax data, frame-based syntax data, and GOP-based syntax data, to video decoder 30, e.g., in a frame header, a block header, a slice header, or a GOP header. The GOP syntax data may describe a number of frames in the respective GOP, and the frame syntax data may indicate an encoding/prediction mode used to encode the corresponding frame.

Efforts are currently in progress to develop a new video coding standard, currently referred to as High Efficiency Video Coding (HEVC). The upcoming standard is also referred to as H.265. The standardization efforts are based on a model of a video coding device referred to as the HEVC Test Model (HM). The HM presumes several capabilities of video coding devices over devices according to, e.g., ITU-T H.264/AVC. For example, whereas H.264 provides nine intra-prediction encoding modes, HM provides as many as thirty-three intra-prediction encoding modes.

HM refers to a block of video data as a coding unit (CU). Syntax data within a bitstream may define a largest coding unit (LCU), which is a largest coding unit in terms of the number of pixels. In general, a CU has a similar purpose to a macroblock of H.264, except that a CU does not have a size distinction. Thus, a CU may be split into sub-CUs. In general, references in this disclosure to a CU may refer to a largest coding unit of a picture or a sub-CU of an LCU. An LCU may be split into sub-CUs, and each sub-CU may be split into sub-CUs. Syntax data for a bitstream may define a maximum number of times an LCU may be split, referred to as CU depth. Accordingly, a bitstream may also define a smallest coding unit (SCU). This disclosure also uses the term "block" to refer to any of a CU, PU, or TU.

An LCU may be associated with a quadtree data structure. In general, a quadtree data structure includes one node per CU, where a root node corresponds to the LCU. If a CU is split into four sub-CUs, the node corresponding to the CU includes four leaf nodes, each of which corresponds to one of the sub-CUs. Each node of the quadtree data structure may provide syntax data for the corresponding CU. For example, a node in the quadtree may include a split flag, indicating whether the CU corresponding to the node is split into sub-CUs. Syntax elements for a CU may be defined recursively, and may depend on whether the CU is split into sub-CUs.

A CU that is not split may include one or more prediction units (PUs). In general, a PU represents all or a portion of the corresponding CU, and includes data for retrieving a reference sample for the PU. For example, when the PU is intra-mode encoded, the PU may include data describing an intra-prediction mode for the PU. As another example, when the PU is inter-mode encoded, the PU may include data defining a motion vector for the PU. The data defining the motion vector may describe, for example, a horizontal component of the motion vector, a vertical component of the motion vector, a resolution for the motion vector (e.g., one-quarter pixel precision or one-eighth pixel precision), a reference frame to which the motion vector points, and/or a reference list (e.g., list 0 or list 1) for the motion vector. Data for the CU defining the PU(s) may also describe, for example, partitioning of the CU into one or more PUs. Partitioning modes may differ between whether the CU is uncoded, intra-prediction mode encoded, or inter-prediction mode encoded.

A CU having one or more PUs may also include one or more transform units (TUs). Following prediction using a PU, a video encoder may calculate a residual value for the portion of the CU corresponding to the PU. The residual value may be transformed, scanned, and quantized. A TU is not necessarily limited to the size of a PU. Thus, TUs may be larger or smaller than corresponding PUs for the same CU. In some examples, the maximum size of a TU may correspond to the size of the corresponding CU.

As noted above, intra-prediction includes predicting a PU of a current CU of a picture from previously coded CUs of the same picture. More specifically, a video encoder may intra-predict a current CU of a picture using a particular intra-prediction mode. An HM encoder may be configured with up to thirty-three directional intra-prediction modes and two non-directional intra prediction modes.

An HM encoder may be configured such that the available set of intra-prediction modes for a block differs based on the size of the block. That is, the size of a prediction unit (PU) may determine the number of intra-prediction modes available for the PU, from which the encoder may select an intra-prediction mode to predict the PU. Table 1 below illustrates one example of a correspondence between prediction unit sizes and the number of directional intra-prediction modes available for PUs of that size.

TABLE 1

| Prediction Unit Size | Number of Directional Intra-Prediction Modes |
|---|---|
| 4 × 4 | 33 |
| 8 × 8 | 33 |
| 16 × 16 | 33 |
| 32 × 32 | 33 |

In accordance with the techniques of this disclosure, video encoder 20 may be configured to determine whether to enable or disable secondary boundary filtering. That is, video encoder 20 and video decoder 30 may be configured to determine whether to apply a filter to an intra-predicted block of video data, which was predicted using a primary boundary, where the filter uses data of a secondary boundary. Video encoder 20 may be configured to provide information to video decoder 30 indicative of whether video decoder 30 should perform secondary boundary filtering for particular blocks of video data. Alternatively, video decoder 30 may perform techniques similar to those of video encoder 20 for determining whether to perform secondary boundary filtering. In either case, video decoder 30 may be configured to determine whether to perform secondary boundary filtering for boundaries between intra-coded blocks of video data.

Figure 4:
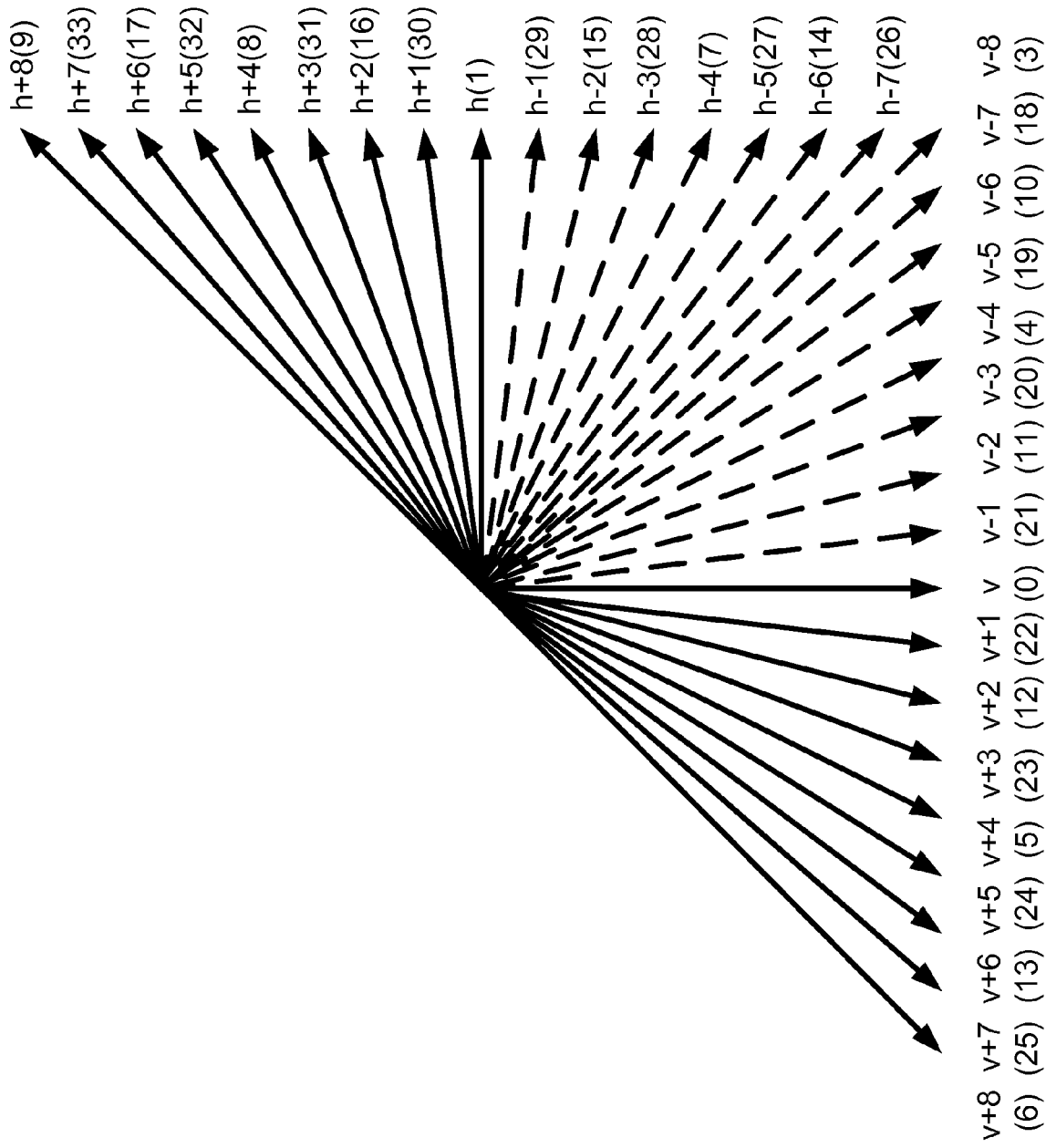
FIG. 4 is a conceptual diagram illustrating various intra-prediction mode directions in HEVC.

More particularly, video encoder 20 and video decoder 30 may be configured to intra-predict certain blocks of video data. The intra-prediction modes include directional intra-prediction modes, e.g., as illustrated in FIG. 4, which is described in greater detail below. Other intra-prediction modes include non-directional intra-prediction modes, such as DC mode and planar mode. Certain directional intra-prediction modes may be described as relatively horizontal or relatively vertical, while other directional intra-prediction modes may be described as relatively diagonal.

As described in this disclosure, relatively horizontal and relatively vertical intra-prediction modes are those that utilize data from one primary boundary to predict a corresponding block, whereas the relatively diagonal intra-prediction modes are those that utilize data from two boundaries to predict the corresponding block. For example, the relatively horizontal prediction modes utilize data from a left-side boundary of the block to predict the block, while the relatively vertical prediction modes utilize data from a top-side boundary of the block to predict the block. Thus, the left-side boundary may be considered a primary boundary for relatively horizontal prediction modes, while the top-side boundary may be considered a primary boundary for the relatively vertical prediction modes.

The relatively diagonal intra-prediction modes, on the other hand, use data of both the left-side boundary and the top-side boundary, and therefore, neither the top-side boundary nor the left-side boundary is considered a primary boundary for these modes. Alternatively, in other examples, for relatively diagonal intra-prediction modes, both boundaries may be considered primary, or a more heavily weighted boundary (in terms of contribution to the prediction) may be considered primary. For non-directional intra-prediction modes, such as DC and planar modes, both the top-side boundary and the left-side boundary may be considered primary boundaries. Likewise, data from both boundaries may be used to perform secondary boundary filtering in the case of non-directional intra-prediction modes.

In accordance with the techniques of this disclosure, after intra-predicting a block using data of a primary boundary (e.g., using a relatively horizontal or relatively vertical directional intra-prediction mode), video encoder 20 and video decoder 30 may determine whether to filter the predicted block using data of a secondary boundary of the block. For example, after forming a predicted block using data of a left-side boundary of a current block as the primary boundary, video encoder 20 and video decoder 30 may determine whether to filter the predicted block using data of a top-side boundary as the secondary boundary. As discussed above, forming the predicted block using data of a left-side boundary as the primary boundary may result from intra-predicting the current block using a relatively horizontal intra-prediction mode. As another example, after forming a predicted block using data of a top-side boundary of a current block as the primary boundary, video encoder 20 and video decoder 30 may determine whether to filter the predicted block using data of a left-side boundary as the secondary boundary. As also discussed above, forming the predicted block using data of a top-side boundary as the primary boundary may result from intra-predicting the current block using a relatively vertical intra-prediction mode.

To determine whether to apply a secondary boundary filter to a predicted block, video encoder 20 (as an example) may calculate a value representing a boundary relationship. Such a value, which may be referred to as a boundary relationship value, may describe a relationship between values of a primary boundary to values of a secondary boundary, or may describe a relationship between values of either the primary and/or the secondary boundary to values of the predicted block itself. After calculating the boundary relationship value, video encoder 20 may determine whether to apply a secondary boundary filter to the predicted block based on whether the value exceeds a threshold. Video encoder 20 may calculate the boundary relationship value using, for example, Laplacians or gradient differences.

Video decoder 30 may also calculate a boundary relationship value, similar to video encoder 20. Alternatively, video encoder 20 may be configured to code signaling data indicating whether to filter a predicted block. That is, video encoder 20 may encode syntax information representative of whether to filter a predicted block using data of a secondary boundary. Likewise, video decoder 30 may be configured to decode syntax information representative of whether to filter a predicted block using data of a secondary boundary. Thus, rather than calculating a secondary boundary value, video decoder 30 may selectively filter a predicted block using data of a secondary boundary based on the decoded syntax data.

As discussed above, video encoder 20 and video decoder 30 may be configured to determine whether to filter a predicted block, which was predicted using data of a primary boundary, using data of a secondary boundary. Such filtering may be referred to as secondary boundary filtering. In general, secondary boundary filtering involves modifying data of the predicted block using data of the secondary boundary. For example, values of one or more pixels along the secondary boundary may be mathematically applied to modify values of one or more pixels of the predicted block. As one example of secondary boundary filtering, for each pixel value produced in the intra-predicted block using the primary boundary, an offset may be computed based on a weighted difference between two particular pixel values at the secondary boundary. The offset can be added to the pixel value in the predicted block to produce a modified pixel value.

Video encoder 20 and video decoder 30 may also code the intra-predicted block, whether or not the predicted block was filtered using data of the secondary boundary. That is, if the predicted block was not filtered, video encoder 20 and video decoder 30 may code the block using the predicted block. In particular, video encoder 20 may calculate residual values, representing pixel-by-pixel differences between the predicted block and the original block, then code (e.g., transform, quantize, and entropy encode) the residual values. Video decoder 30, likewise, may decode residual values and combine the residual values with the predicted block to decode the block.

On the other hand, if the predicted block was secondary boundary filtered, video encoder 20 and video decoder 30 may code the block using the filtered predicted block. In particular, video encoder 20 may calculate residual values, representing pixel-by-pixel differences between the filtered predicted block and the original block, then code (e.g., transform, quantize, and entropy encode) the residual values. Video decoder 30, likewise, may decode residual values and combine the residual values with the filtered predicted block to decode the block.

Video encoder 20 and video decoder 30 each may be implemented as any of a variety of suitable encoder or decoder circuitry, as applicable, such as one or more microprocessors, digital signal processors (DSPs), application specific integrated circuits (ASICs), field programmable gate arrays (FPGAs), discrete logic circuitry, software, hardware, firmware or any combinations thereof. Each of video encoder 20 and video decoder 30 may be included in one or more encoders or decoders, either of which may be integrated as part of a combined video encoder/decoder (CODEC). An apparatus including video encoder 20 and/or video decoder 30 may comprise an integrated circuit, a microprocessor, and/or a wireless communication device, such as a cellular telephone.

In this manner, video encoder 20 and video decoder 30 each represent an example of a video coder configured to intra-predict a block of video data, using values of pixels along a primary boundary of the block, to form a predicted block, determine whether to filter the predicted block using data of a secondary boundary of the block, and filter the predicted block using data of the secondary boundary in response to determining to filter the predicted block.

As noted above, intra-predicting a block of video data may include intra-predicting a current block of video data using, e.g., a relatively horizontal or relatively vertical intra-prediction mode. As discussed in greater detail with respect to FIG. 4, relatively horizontal and relatively vertical intra-prediction modes, in this disclosure, are those modes that utilize data of primarily one boundary of the current block. The primary boundary may correspond to, for example, a left-side boundary or a top-side boundary. In particular, the left-side boundary includes pixels of one or more left-neighboring blocks, whereas the top-side boundary includes pixels of one or more top-neighboring blocks.

Although this disclosure primarily describes these techniques as corresponding to the use of a relatively horizontal or relatively vertical intra-prediction mode, these techniques may also be applied to relatively diagonal intra-prediction modes and/or non-directional intra-prediction modes, such as DC mode and planar mode. For example, in DC mode and planar mode, both boundaries may be considered primary boundaries and secondary boundaries.

Determining whether to filter a predicted block may include calculating a Laplacian boundary relationship value and/or a gradient difference boundary relationship value, as discussed above. Moreover, determining whether to filter the predicted block may include comparing the boundary relationship value to a threshold value. The threshold value may be specific to the manner in which the boundary relationship value was calculated. For example, a first threshold value may be defined for Laplacian boundary relationship values, and a second threshold value may be defined for gradient difference boundary relationship values. In some examples, when the boundary relationship value is less than the threshold, secondary boundary filtering may be enabled.

Figure 2:
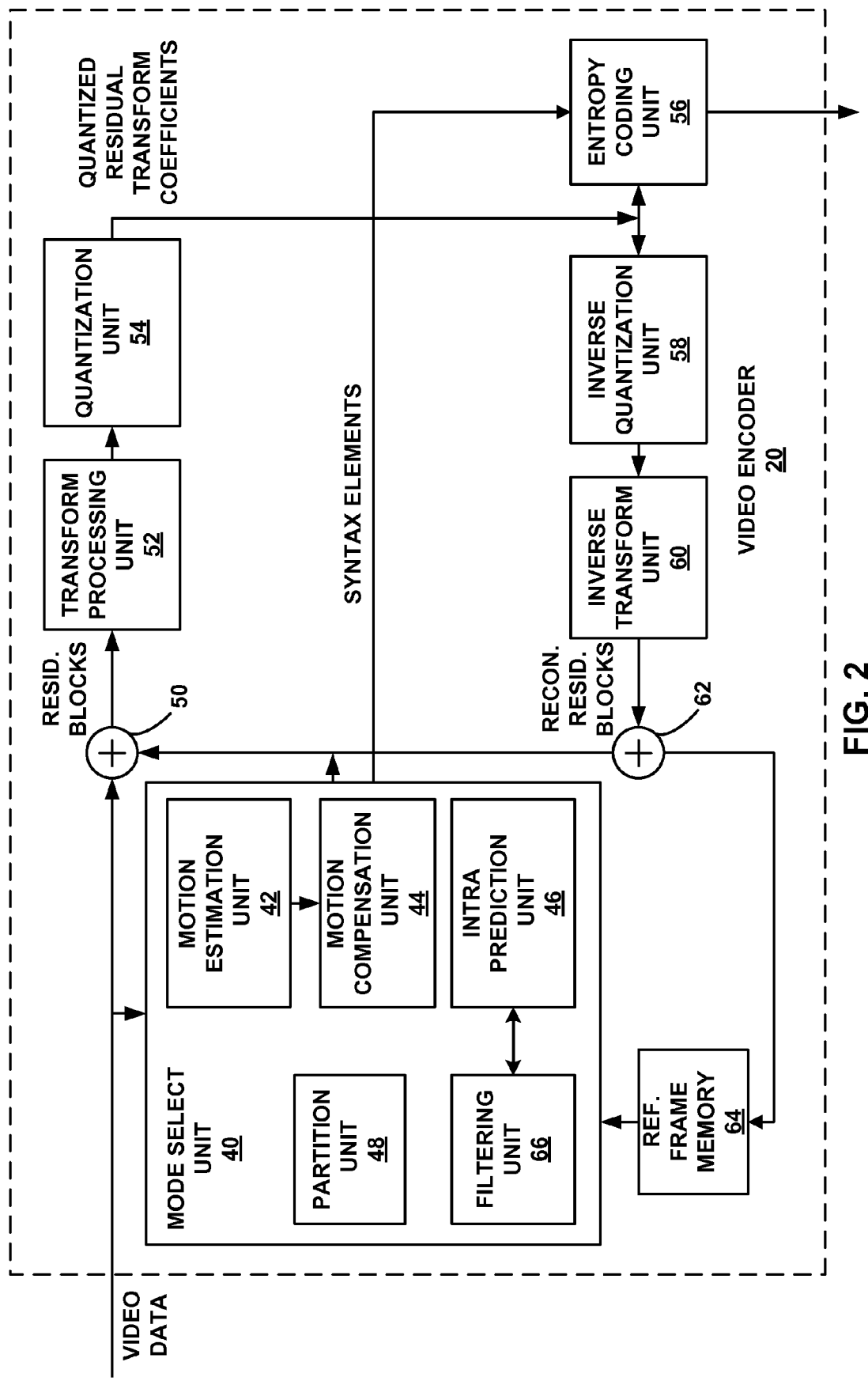
FIG. 2 is a block diagram illustrating an example of video encoder that may implement techniques for determining whether to perform secondary boundary filtering.

FIG. 2 is a block diagram illustrating an example of video encoder 20 that may implement techniques for determining whether to perform secondary boundary filtering. Video encoder 20 may perform intra- and inter-coding of blocks within video frames, including blocks, or partitions or sub-partitions of blocks. Intra-coding relies on spatial prediction to reduce or remove spatial redundancy in video within a given video frame. Inter-coding relies on temporal prediction to reduce or remove temporal redundancy in video within adjacent frames of a video sequence. Intra-mode (I-mode) may refer to any of several spatial based compression modes and inter-modes such as uni-directional prediction (P-mode) or bi-directional prediction (B-mode) may refer to any of several temporal-based compression modes. Although components for inter-mode encoding are depicted in FIG. 2, it should be understood that video encoder 20 may further include components for intra-mode encoding. However, such components are not illustrated for the sake of brevity and clarity.

As shown in FIG. 2, video encoder 20 receives a current video block within a video frame to be encoded. In the example of FIG. 2, video encoder 20 includes mode select unit 40, reference frame memory 64, summer 50, transform processing unit 52, quantization unit 54, and entropy coding unit 56. Mode select unit 40, in turn, includes motion compensation unit 44, motion estimation unit 42, intra-prediction unit 46, filtering unit 66, and partition unit 48. For video block reconstruction, video encoder 20 also includes inverse quantization unit 58, inverse transform unit 60, and summer 62. In addition, video encoder 20 may include a de-blocker (not shown), which may de-block the output of summer 62 and store deblocked video data in reference frame memory 64.

During the encoding process, video encoder 20 receives a video frame or slice to be coded. The frame or slice may be divided into multiple video blocks. Motion estimation unit 42 and motion compensation unit 44 perform inter-predictive coding of the received video block relative to one or more blocks in one or more reference frames to provide temporal compression. Intra-prediction unit 46 may alternatively perform intra-predictive coding of the received video block relative to one or more neighboring blocks in the same frame or slice as the block to be coded to provide spatial compression. In accordance with the techniques of this disclosure, as described in greater detail below, intra-prediction unit 46 may utilize filtering unit 66 to filter a predicted block, e.g., to perform secondary boundary filtering. Video encoder 20 may perform multiple coding passes, e.g., to select an appropriate coding mode for each block of video data.

Moreover, partition unit 48 may partition blocks of video data into sub-blocks, based on evaluation of previous partitioning schemes in previous coding passes. For example, partition unit 48 may initially partition a frame or slice into LCUs, and partition each of the LCUs into sub-CUs based on rate-distortion analysis (e.g., rate-distortion optimization). Mode select unit 40 may further produce a quadtree data structure indicative of partitioning of an LCU into sub-CUs. Leaf-node CUs of the quadtree may include one or more PUs and one or more TUs.

Mode select unit 40 may select one of the coding modes, intra or inter, e.g., based on error results, and provides the resulting intra- or inter-coded block to summer 50 to generate residual block data and to summer 62 to reconstruct the encoded block for use as a reference frame. Mode select unit 40 also provides syntax elements, such as motion vectors, intra-mode indicators, partition information, and other such syntax information, to entropy coding unit 56.

Motion estimation unit 42 and motion compensation unit 44 may be highly integrated, but are illustrated separately for conceptual purposes. Motion estimation is the process of generating motion vectors, which estimate motion for video blocks. A motion vector, for example, may indicate the displacement of a predictive block within a predictive reference frame (or other coded unit) relative to the current block being coded within the current frame (or other coded unit). A predictive block is a block that is found to closely match the block to be coded, in terms of pixel difference, which may be determined by sum of absolute difference (SAD), sum of square difference (SSD), or other difference metrics. A motion vector may also indicate displacement of a partition of a block. Motion compensation may involve fetching or generating the predictive block based on the motion vector determined by motion estimation. Again, motion estimation unit 42 and motion compensation unit 44 may be functionally integrated, in some examples.

Motion estimation unit 42 calculates a motion vector for the video block of an inter-coded frame by comparing the video block to video blocks of a reference frame in reference frame memory 64. Motion compensation unit 44 may also interpolate sub-integer pixels of the reference frame, e.g., an I-frame or a P-frame. The ITU H.264 standard, as an example, describes two lists: list 0, which includes reference frames having a display order earlier than a current frame being encoded, and list 1, which includes reference frames having a display order later than the current frame being encoded. Therefore, data stored in reference frame memory 64 may be organized according to these lists.

Motion estimation unit 42 compares blocks of one or more reference frames from reference frame memory 64 to a block to be encoded of a current frame, e.g., a P-frame or a B-frame. When the reference frames in reference frame memory 64 include values for sub-integer pixels, a motion vector calculated by motion estimation unit 42 may refer to a sub-integer pixel location of a reference frame. Motion estimation unit 42 and/or motion compensation unit 44 may also be configured to calculate values for sub-integer pixel positions of reference frames stored in reference frame memory 64 if no values for sub-integer pixel positions are stored in reference frame memory 64. Motion estimation unit 42 sends the calculated motion vector to entropy coding unit 56 and motion compensation unit 44. The reference frame block identified by a motion vector may be referred to as a predictive block. Motion compensation unit 44 may calculate prediction data based on the predictive block.

Intra-prediction unit 46 may intra-predict a current block, as an alternative to the inter-prediction performed by motion estimation unit 42 and motion compensation unit 44 described above. In particular, intra-prediction unit 46 may determine an intra-prediction mode to use to encode a current block. In some examples, intra-prediction unit 46 may encode a current block using various intra-prediction modes, e.g., during separate encoding passes, and intra-prediction unit 46 (or mode select unit 40, in some examples) may select an appropriate intra-prediction mode to use from the tested modes.

For example, intra-prediction unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bit rate (that is, a number of bits) used to produce the encoded block. Intra-prediction unit 46 may calculate ratios from the distortions and rates for the various encoded blocks to determine which intra-prediction mode exhibits the best rate-distortion value for the block. After selecting an intra-prediction mode for a block, intra-prediction unit 46 may provide information indicative of the selected intra-prediction mode for the block to entropy coding unit 56.

In accordance with the techniques of this disclosure, intra-prediction unit 46 may selectively enable or disable (wholly or partially) secondary boundary filtering during intra-prediction coding of a block (e.g., a PU) of video data. In particular, intra-prediction unit 46, or mode select unit 40, may calculate a value representative of a boundary relationship between two boundaries, e.g., a left-neighboring boundary and an above-neighboring boundary, of a current block, e.g., a current PU. Alternatively, intra-prediction unit 46, or mode select unit 40, may calculate a value representative of a boundary relationship between a boundary of a current block (e.g., a current PU) and pixel values of the current block.

In general, filtering unit 66, on behalf of intra-prediction unit 46, filters a predicted block of video data based at least in part on the boundary relationship. More particularly, in accordance with the techniques of this disclosure (as described in greater detail with respect to FIG. 5), intra-prediction unit 46 may determine whether to enable or disable secondary boundary filtering of intra-predicted blocks of video data. Selectively enabling or disabling secondary boundary filtering may improve the predicted value for a block, e.g., a PU, which may thereby improve the BD-rate for the block. When intra-prediction unit 46 (or mode select unit 40) enables secondary boundary filtering, filtering unit 66 may filter a predicted block (e.g., a PU) of video data. Mode select unit 40 may also provide the predicted block (or, following filtering by filtering unit 66, the filtered predicted block) to summer 50.

To filter a predicted block using a secondary boundary, filtering unit 66 may modify individual pixels $P_{ij}$ of the predicted block using one or more values of the secondary boundary. For example, let (i, j) correspond to a pixel of the predicted block at position (i, j), wherein an upper-left corner of the predicted block is at position (0, 0). Let $P_{ij}$ correspond to the pixel at position (i, j) of a predicted block. Let $P'_{ij}$ correspond to a filtered pixel at position (i, j), that is, having the value of $P_{ij}$ as modified by filtering unit 66. Filtering unit 66 may calculate $P'_{ij}$ for a predicted block that was predicted using a relatively vertical intra-prediction mode as follows:

$$P'ij = Pij + \alpha \cdot (Li - RLi), \quad (1)$$

where $\alpha$ is a fraction between 0 and 1 and is selected according to j and i for vertical mode and horizontal mode respectively, RLi represents a reference sample in the left-side boundary corresponding to $P_{ij}$ (that is, a pixel in the left-side boundary at position i), and $L_i$ represents the reference sample at position i in the left column of the current block. In one example, $\alpha=\frac{1}{2}$ when j(i)=0, $\alpha=\frac{1}{4}$ when j(i)=1, $\alpha=\frac{1}{8}$ when j(i)=2, and $\alpha=\frac{1}{16}$ when j(i)=3,4.

Filtering unit 66 may calculate $P'_{ij}$ for a predicted block that was predicted using a relatively horizontal intra-mode as follows:

$$P'ij = Pij + \alpha \cdot (Aj - RAj), \quad (2)$$

where $\alpha$ is a fraction between 0 and 1 and is selected according to j and i for vertical mode and horizontal mode respectively (as noted above), RAj represents a reference sample in the top-side boundary corresponding to $P_{ij}$ (that is, a pixel in the top-side boundary at position j), and $A_j$ represents the reference sample at position j in the above row. As noted above, in one example, $\alpha=\frac{1}{2}$ when j(i)=0, $\alpha=\frac{1}{4}$ when j(i)=1, $\alpha=\frac{1}{8}$ when j(i)=2, and $\alpha=\frac{1}{16}$ when j(i)=3,4.

Mode select unit 40 may select a relatively horizontal or relatively vertical intra-prediction mode for intra-prediction unit 46 to use to predict a current block of video data. Intra-prediction unit 46 may form a predicted block (e.g., a PU) using data of a primary boundary in accordance with the relatively horizontal or relatively vertical intra-prediction mode. The primary boundary may correspond to, for example, a left-side boundary of the block for the relatively horizontal modes or a top-side boundary of the block for the relatively vertical modes. A secondary boundary may correspond to a boundary of the block that is different than the primary boundary. For example, the secondary boundary may correspond to the top-side boundary when the primary boundary is the left-side boundary, and the secondary boundary may correspond to the left-side boundary when the primary boundary is the top-side boundary. Mode select unit 40 may further determine whether to filter the predicted block (that is, the predicted block resulting from intra-prediction using either the relatively horizontal or relatively vertical intra-prediction mode) using data of a secondary boundary of the block (that is, whether to perform secondary boundary filtering).

In some examples, mode select unit 40 may calculate a value representing a boundary relationship (also referred to herein as a boundary relationship value). Mode select unit 40 may calculate the boundary relationship value to represent either values of one or more pixels of the primary boundary and pixel values of one or more pixels of the secondary boundary, or values of one or more pixels of at least one of the primary boundary and the secondary boundary and pixel values of one or more pixels of the predicted block. Mode select unit 40 may determine whether to filter the predicted block using the secondary boundary based on a comparison of the boundary relationship value to a threshold.

In some examples, calculating the boundary relationship value may include calculating a Laplacian value. For example, when intra-prediction unit 46 predicts the block using a relatively horizontal intra-prediction mode, mode select unit 40 may calculate the Laplacian value according to the formula:

$$\max(|TR[N-2]-2*TR[N-1]+TR[N]|, |TR[N-3]-2*TR[N-2]+TR[N-1]|).$$

In this example function, TR[k] corresponds to the $k^{th}$ pixel along the top-side boundary starting from the left edge of the block, and N is an integer value representing a width of the block. More specifically, pixels along the top-side boundary of the block may be indexed from 0 to N, where 0 represents a leftmost pixel of the block and N represents a rightmost pixel of the block, such that the width of the block is (N+1).

As another example, when intra-prediction unit 46 predicts the block using a relatively vertical intra-prediction mode, mode select unit 40 may calculate the Laplacian value according to the formula:

$$\max(|SR[N-2]-2*SR[N-1]+SR[N]|, |SR[N-3]-2*SR[N-2]+SR[N-1]|).$$

In this example function, SR[j] corresponds to the $j^{th}$ pixel along the left side boundary starting from the top edge of the block, and N is an integer value representing a height of the block. More specifically, pixels along the left-side boundary of the block may be indexed from 0 to N, where 0 represents a topmost pixel of the block and N represents a bottommost pixel of the block, such that the height of the block is (N+1).

Although primarily described above as relating to the use of directional intra-prediction modes, such as relatively horizontal and relatively vertical intra-prediction modes, the techniques of this disclosure may also be applied to determine whether to apply secondary boundary filtering to a predicted block that results from a non-directional intra-prediction mode, such as DC mode or Planar mode. In such cases, calculating a Laplacian value may be performed according to the following formula:

$$\max(|TR[N-2]-2*TR[N-1]+TR[N]|, |TR[N-3]-2*TR[N-2]+TR[N-1]|, |SR[N-2]-2*SR[N-1]+SR[N]|, |SR[N-3]-2*SR[N-2]+SR[N-1]|).$$

As in the above examples, in this example, TR[k] corresponds to the $k^{th}$ pixel along the top-side boundary starting from the left edge of the block, while SR[j] corresponds to the $j^{th}$ pixel along the left side boundary starting from the top edge of the block. In this example, the block is assumed to be square, and the value N is an integer value that represents both a height and a width of the block. As noted above, the height may equal the width, and both height and width may equal (N+1), assuming zero-indexing of the first pixels (leftmost and topmost pixels) of the block.

In other examples, mode select unit 40 may calculate the boundary relationship value as a gradient difference value. For example, when intra-prediction unit 46 calculates the predicted block using a relatively horizontal intra-prediction mode, mode select unit 40 may calculate the boundary relationship value according to the formula:

$$\max(|TR[N]-P[N,0]|, |TR[N-1]-P[N-1,0]|, |TR[N]-P[N-1,0]|, |TR[N-1]-P[N,0]|).$$

As in the examples above, in this example, TR[k] corresponds to the $k^{th}$ pixel along the top-side boundary starting from the left edge of the block, and N is an integer value representing a width of the block. P(i, j) corresponds to the pixel of the predicted block at position (i, j), in this example.

As another example, when intra-prediction unit 46 calculates the predicted block using a relatively vertical intra-prediction mode, mode select unit 40 may calculate the boundary relationship value according to the formula:

$$\max(|SR[N]-P[0,N]|, |SR[N-1]-P[0,N-1]|, |SR[N]-P[0,N-1]|, |SR[N-1]-P[0,N]|).$$

As in the examples above, in this example, SR[j] corresponds to the $j^{th}$ pixel along the left-side boundary starting from the top edge of the block, and N is an integer value representing a height of the block.

In any case, mode select unit 40 may determine whether the predicted block should be secondary boundary filtered, e.g., by comparing the boundary relationship value to a threshold value. In some examples, mode select unit 40 may include data defining different threshold values based on various characteristics, e.g., whether the boundary relationship value is a Laplacian value or a gradient difference value. In the case that mode select unit 40 determines that the predicted block should be secondary boundary filtered, filtering unit 66 may apply a secondary boundary filter to the block. That is, intra-prediction unit 46 may send data representative of the predicted block to filtering unit 66, which may then modify the data using data of a secondary boundary. Intra-prediction unit 46 or mode select unit 40 may also send data to filtering unit 66 indicating which of the boundaries is considered the primary boundary and which of the boundaries is considered a secondary boundary. Filtering unit 66 may retrieve data of the secondary boundary from reference frame memory 64 to perform the secondary boundary filtering.

Video encoder 20 forms a residual video block by subtracting the prediction data (that is, the predicted block) from mode select unit 40 from the original video block being coded. Summer 50 represents the component or components that perform this subtraction operation. The residual video block represents pixel-by-pixel differences between the predicted (and possibly filtered) block and the original block to which the predicted block corresponds. More particularly, mode select unit 40 may send the predicted block to summer 50 when mode select unit 40 determines not to filter the predicted block using secondary boundary filtering. Alternatively, when mode select unit 40 determines that the predicted block should be secondary boundary filtered, mode select unit 40 may send the filtered predicted block (resulting from secondary boundary filtering performed by filtering unit 66) to summer 50. In this manner, video encoder 20 may encode the block (that is, the original block to which the predicted block corresponds) using the predicted block in response to determining not to filter the predicted block, and encode the block using the filtered predicted block in response to determining to filter the predicted block.

Transform processing unit 52 applies a transform, such as a discrete cosine transform (DCT) or a conceptually similar transform, to the residual block, producing a video block comprising residual transform coefficient values. Transform processing unit 52 may perform other transforms, such as those defined by the H.264 standard or the upcoming HEVC standard, which are conceptually similar to DCT. Wavelet transforms, integer transforms, sub-band transforms or other types of transforms could also be used. In any case, transform processing unit 52 applies the transform to the residual block, producing a block of residual transform coefficients. The transform may convert the residual information from a pixel value domain to a transform domain, such as a frequency domain. Quantization unit 54 quantizes the residual transform coefficients to further reduce bit rate. The quantization process may reduce the bit depth associated with some or all of the coefficients. The degree of quantization may be modified by adjusting a quantization parameter.

Following quantization, entropy coding unit 56 entropy codes the quantized transform coefficients. For example, entropy coding unit 56 may perform content adaptive variable length coding (CAVLC), context adaptive binary arithmetic coding (CABAC), or another entropy coding technique. Entropy coding unit 56 may also entropy code syntax elements from mode select unit 40, such as motion vectors, intra-mode indicators, partition information, and the like. Following the entropy coding by entropy coding unit 56, the encoded video may be transmitted to another device or archived for later transmission or retrieval. In the case of context adaptive binary arithmetic coding, context may be based on neighboring blocks.

In some cases, entropy coding unit 56 or another unit of video encoder 20 may be configured to perform other coding functions, in addition to entropy coding. For example, entropy coding unit 56 may be configured to determine the CBP values for the blocks and partitions. Also, in some cases, entropy coding unit 56 may perform run length coding of the coefficients in a block or partition thereof. In particular, entropy coding unit 56 may apply a zig-zag scan or other scan pattern to scan the transform coefficients in a block or partition and encode runs of zeros for further compression. Entropy coding unit 56 also may construct header information with appropriate syntax elements for transmission in the encoded video bitstream.

Inverse quantization unit 58 and inverse transform unit 60 apply inverse quantization and inverse transformation, respectively, to reconstruct the residual block in the pixel domain, e.g., for later use as a reference block. Motion compensation unit 44 may calculate a reference block by adding the residual block to a predictive block of one of the frames of reference frame memory 64. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reconstructed video block for storage in reference frame memory 64. The reconstructed video block may be used by motion estimation unit 42 and motion compensation unit 44 as a reference block to inter-code a block in a subsequent video frame.

In this manner, video encoder 20 represents an example of a video coder configured to intra-predict a block of video data, using values of pixels along a primary boundary of the block, to form a predicted block, determine whether to filter the predicted block using data of a secondary boundary of the block, and filter the predicted block using data of the secondary boundary in response to determining to filter the predicted block.

Figure 3:
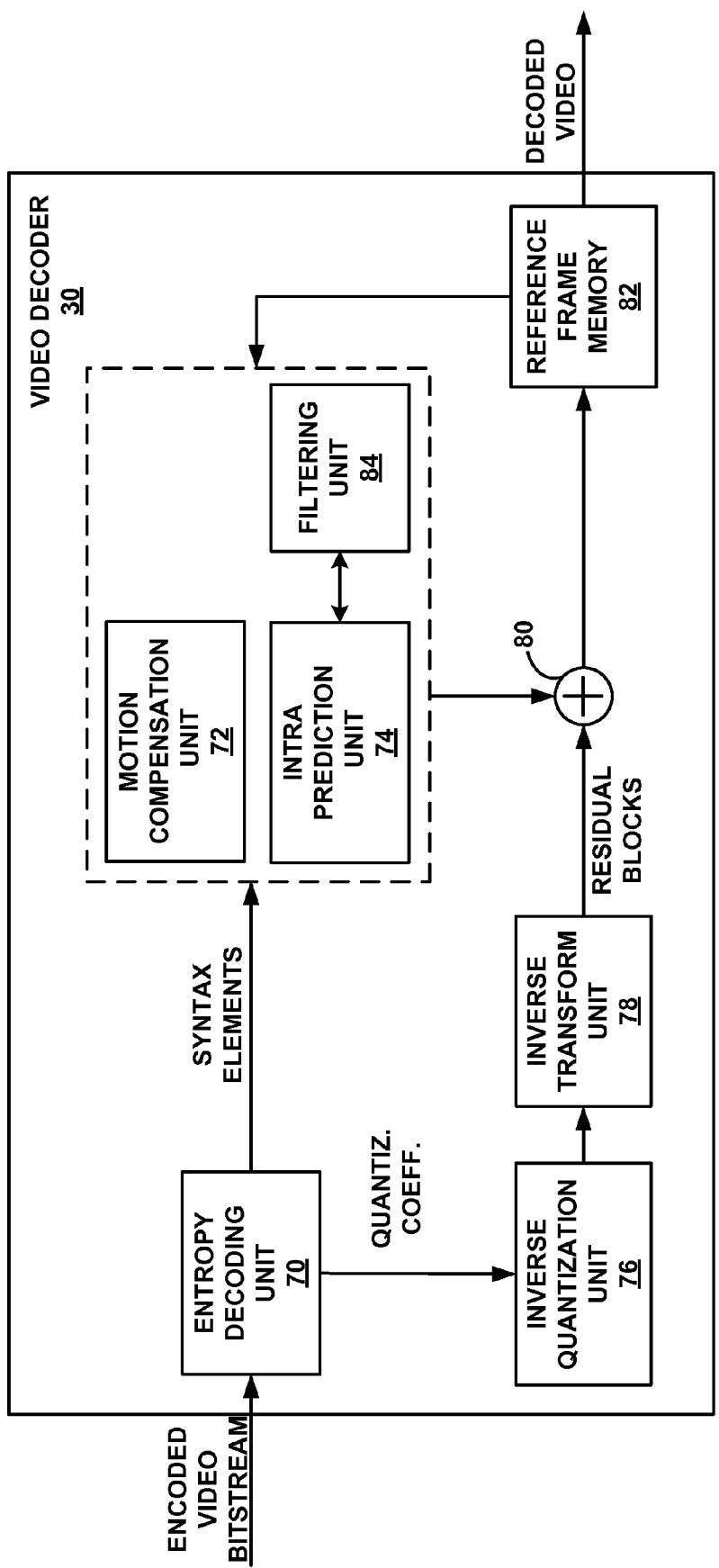
FIG. 3 is a block diagram illustrating an example of video decoder that may implement techniques for determining whether to perform secondary boundary filtering.

FIG. 3 is a block diagram illustrating an example of video decoder 30 that may implement techniques for determining whether to perform secondary boundary filtering. In the example of FIG. 3, video decoder 30 includes an entropy decoding unit 70, motion compensation unit 72, intra prediction unit 74, filtering unit 84, inverse quantization unit 76, inverse transformation unit 78, reference frame memory 82, and summer 80. In some examples, video decoder 30 may include a de-blocker (not shown), which may filter the output of summer 80 and store de-blocked video data to reference frame memory 82. Video decoder 30 may, in some examples, perform a decoding pass generally reciprocal to the encoding pass described with respect to video encoder 20 (FIG. 2).

Motion compensation unit 72 may generate prediction data based on motion vectors received from entropy decoding unit 70. Motion compensation unit 72 may use motion vectors received in the bitstream to identify a prediction block in reference frames in reference frame memory 82. Intra prediction unit 74 may use intra prediction modes received in the bitstream to form a prediction block from spatially adjacent blocks.

In accordance with the techniques of this disclosure, intra-prediction unit 74 may selectively enable or disable (wholly or partially) secondary boundary filtering during intra-prediction coding of a block (e.g., a PU) of video data. In particular, intra-prediction unit 74 may calculate a value representative of a boundary relationship between two boundaries, e.g., a left-neighboring boundary and an above-neighboring boundary, of a current block, e.g., a current PU. Alternatively, intra-prediction unit 74 may calculate a value representative of a boundary relationship between a boundary of a current block (e.g., a current PU) and pixel values of the current block.

In such examples, intra-prediction unit 74 selectively determines whether to filter a predicted block corresponding to a current block of video data based at least in part on the boundary relationship. More particularly, in accordance with the techniques of this disclosure (e.g., as described in greater detail with respect to FIG. 5), intra-prediction unit 74 may determine whether to enable or disable secondary boundary filtering of intra-predicted blocks of video data. Selectively enabling or disabling secondary boundary filtering may improve the predicted value for a block, e.g., a PU, which may thereby improve the BD-rate for the block.

In examples in which intra-prediction unit 74 calculates a boundary relationship value, intra-prediction unit 74 may calculate the boundary relationship value in a manner substantially similar to that of video encoder 20 as discussed with respect to FIG. 2. For example, intra-prediction unit 74 may calculate a Laplacian value. As one example, when intra-prediction unit 74 predicts the block using a relatively horizontal intra-prediction mode (e.g., as indicated by syntax data for the current block representative of an intra-prediction mode), intra-prediction unit 74 may calculate the Laplacian value according to the formula:

$$\max(|TR[N-2]-2*TR[N-1]+TR[N]|, |TR[N-3]-2*TR[N-2]+TR[N-1]|).$$

In this example function, TR[k] corresponds to the $k^{th}$ pixel along the top-side boundary starting from the left edge of the block, and N is an integer value representing a width of the block. More specifically, pixels along the top-side boundary of the block may be indexed from 0 to N, where 0 represents a leftmost pixel of the block and N represents a rightmost pixel of the block, such that the width of the block is (N+1).

As another example, when intra-prediction unit 74 predicts the block using a relatively vertical intra-prediction mode (again, according to syntax data indicating an intra-prediction mode), intra-prediction unit 74 may calculate the Laplacian value according to the formula:

$$\max(|SR[N-2]-2*SR[N-1]+SR[N]|, |SR[N-3]-2*SR[N-2]+SR[N-1]|).$$

In this example function, SR[j] corresponds to the $j^{th}$ pixel along the left side boundary starting from the top edge of the block, and N is an integer value representing a height of the block. More specifically, pixels along the left-side boundary of the block may be indexed from 0 to N, where 0 represents a topmost pixel of the block and N represents a bottommost pixel of the block, such that the height of the block is (N+1).

Although primarily described above as relating to the use of directional intra-prediction modes, such as relatively horizontal and relatively vertical intra-prediction modes, the techniques of this disclosure may also be applied to determine whether to apply secondary boundary filtering to a predicted block that results from a non-directional intra-prediction mode, such as DC mode or Planar mode. In such cases, calculating a Laplacian value may be performed according to the following formula:

$$\max(|TR[N-2]-2*TR[N-1]+TR[N]|, |TR[N-3]-2*TR[N-2]+TR[N-1]|, |SR[N-2]-2*SR[N-1]+SR[N]|, |SR[N-3]-2*SR[N-2]+SR[N-1]|).$$

As in the above examples, in this example, TR[k] corresponds to the $k^{th}$ pixel along the top-side boundary starting from the left edge of the block, while SR[j] corresponds to the $j^{th}$ pixel along the left side boundary starting from the top edge of the block. In this example, the block is assumed to be square, and the value N is an integer value that represents both a height and a width of the block. As noted above, the height may equal the width, and both height and width may equal (N+1), assuming zero-indexing of the first pixels (leftmost and topmost pixels) of the block.

In other examples, intra-prediction unit 74 may calculate the boundary relationship value as a gradient difference value. For example, when intra-prediction unit 74 calculates the predicted block using a relatively horizontal intra-prediction mode, intra-prediction unit 74 may calculate the boundary relationship value (corresponding to a gradient difference value) according to the formula:

$$\max(|TR[N]-P[N,0]|, |TR[N-1]-P[N-1,0]|, |TR[N]-P[N-1,0]|, |TR[N-1]-P[N,0]|).$$

As in the examples above, in this example, TR[k] corresponds to the $k^{th}$ pixel along the top-side boundary starting from the left edge of the block, and N is an integer value representing a width of the block. P(i, j) corresponds to the pixel of the predicted block at position (i, j), in this example.

As another example, when intra-prediction unit 74 calculates the predicted block using a relatively vertical intra-prediction mode, intra-prediction unit 74 may calculate the boundary relationship value (corresponding to a gradient difference value) according to the formula:

max(|SR[N]−P[0,N]|, |SR[N−1]−P[0,N−1]|, |SR[N]−P[0,N−1]|, |SR[N−1]−P[0,N]|).

As in the examples above, in this example, SR[j] corresponds to the $j^{th}$ pixel along the left-side boundary starting from the top edge of the block, and N is an integer value representing a height of the block.

In any case, intra-prediction unit 74 may determine whether the predicted block should be secondary boundary filtered, e.g., by comparing the boundary relationship value to a threshold value. In some examples, intra-prediction unit 74 may include data defining different threshold values based on various characteristics, e.g., whether the boundary relationship value is a Laplacian value or a gradient difference value. Such threshold values may be pre-defined, or determined from syntax elements received from a video encoder.

In the case that intra-prediction unit 74 determines that the predicted block should be secondary boundary filtered, filtering unit 84 may apply a secondary boundary filter to the block. That is, intra-prediction unit 74 may send data representative of the predicted block to filtering unit 84, which may then modify the data using data of a secondary boundary. Intra-prediction unit 74 may also send data to filtering unit 84 indicating which of the boundaries is considered the primary boundary and which of the boundaries is considered a secondary boundary. Filtering unit 84 may retrieve data of the secondary boundary from reference frame memory 82 to perform the secondary boundary filtering.

To filter a predicted block using a secondary boundary, filtering unit 84 may modify individual pixels $P_{ij}$ of the predicted block using one or more values of the secondary boundary, in a manner that may be substantially similar to the techniques described with respect to filtering unit 66 of video encoder 20 of FIG. 2. That is, filtering unit 84 may execute equations (1) and/or (2) as appropriate to filter data of a predicted block when secondary boundary filtering is enabled. For example, let (i, j) correspond to a pixel of the predicted block at position (i, j), wherein an upper-left corner of the predicted block is at position (0, 0). Let $P_{ij}$ correspond to the pixel at position (i, j) of a predicted block. Let $P'_{ij}$ correspond to a filtered pixel at position (i, j), that is, having the value of $P_{ij}$ as modified by filtering unit 84. Filtering unit 84 may calculate $P'_{ij}$ for a predicted block that was predicted using a relatively vertical intra-prediction mode as follows:

$$P'_{ij} = P_{ij} + \alpha \cdot (Li - RLi), \quad (1)$$

where α is a fraction between 0 and 1 and is selected according to j and i for vertical mode and horizontal mode respectively, RLi represents a reference sample in the left-side boundary corresponding to $P_{ij}$ (that is, a pixel in the left-side boundary at position i), and $L_i$ represents the reference sample at position i in the left column of the current block. In one example, α=½ when j(i)=0, α=¼ when j(i)=1, α=⅛ when j(i)=2, and α=1/16 when j(i)=3,4.

Filtering unit 84 may calculate $P'_{ij}$ for a predicted block that was predicted using a relatively horizontal intra-mode as follows:

$$P'_{ij} = P_{ij} + \alpha \cdot (Aj - RAj), \quad (2)$$

where α is a fraction between 0 and 1 and is selected according to j and i for vertical mode and horizontal mode respectively (as noted above), RAj represents a reference sample in the top-side boundary corresponding to $P_{ij}$ (that is, a pixel in the top-side boundary at position j), and $A_j$ represents the reference sample at position j in the above row. As noted above, in one example, α=½ when j(i)=0, α=¼ when j(i)=1, α=⅛ when j(i)=2, and α=1/16 when j(i)=3,4.

In other examples, intra-prediction unit 74 may receive a syntax element indicating whether to perform secondary boundary filtering. In such examples, intra-prediction unit 74 need not calculate a boundary relationship value. Instead, intra-prediction unit 74 may determine whether to perform secondary boundary filtering based on the value of the syntax element. As discussed with respect to FIG. 2, a video encoder, such as video encoder 20, may calculate a boundary relationship value and compare the boundary relationship value to a threshold, to determine whether to perform secondary boundary filtering for a particular predicted block, then encode a syntax element indicative of the determination. Thus, video decoder 30 may decode the syntax element to determine whether to filter a predicted block resulting from a relatively horizontal or relatively vertical intra-prediction mode.

Inverse quantization unit 76 inverse quantizes, i.e., de-quantizes, quantized transform coefficients provided in the bitstream and decoded by entropy decoding unit 70. The inverse quantization process may include a conventional process, e.g., as defined by the H.264 decoding standard or the upcoming HEVC standard. The inverse quantization process may also include use of a quantization parameter $QP_Y$ calculated by video decoder 30 for each block to determine a degree of quantization and, likewise, a degree of inverse quantization that should be applied.

Inverse transform unit 58 applies an inverse transform, e.g., an inverse DCT, an inverse integer transform, or a conceptually similar inverse transform process, to the transform coefficients in order to produce residual blocks in the pixel domain. Motion compensation unit 72 produces motion compensated blocks, possibly performing interpolation based on interpolation filters. Identifiers for interpolation filters to be used for motion estimation with sub-pixel precision may be included in the syntax elements. Motion compensation unit 72 may use interpolation filters as used by video encoder 20 during encoding of the video block to calculate interpolated values for sub-integer pixels of a reference block. Motion compensation unit 72 may determine the interpolation filters used by video encoder 20 according to received syntax information and use the interpolation filters to produce predictive blocks.

Motion compensation unit 72 uses some of the syntax information to determine sizes of blocks used to encode frame(s) of the encoded video sequence, partition information that describes how each block of a frame of the encoded video sequence is partitioned, modes indicating how each partition is encoded, one or more reference frames (and reference frame lists) for each inter-encoded block or partition, and other information to decode the encoded video sequence. Alternatively, as discussed above, intra-prediction unit 74 may intra-predict blocks of video data. Moreover, intra-prediction unit 74 may determine whether to cause filtering unit 84 to filter the predicted block, again as discussed above.

Summer 80 sums the residual blocks with the corresponding prediction blocks generated by motion compensation unit 72 or intra-prediction unit 74 to form decoded blocks. More particularly, in accordance with the techniques of this disclosure, when intra-prediction unit 74 produces the predicted block and determines not to perform secondary boundary filtering, summer 80 combines a residual block with the corresponding predicted block. On the other hand, when intra-prediction unit 74 produces a predicted block and causes filtering unit 84 to perform secondary boundary filtering, summer 80 combines the residual block with the corresponding filtered predicted block. If desired, a deblocking filter may also be applied to filter the decoded blocks in order to remove blockiness artifacts. It should be understood that the deblocking filter is separate from the secondary boundary filtering process of this disclosure. The decoded video blocks are then stored in reference frame memory 82, which provides reference blocks for subsequent motion compensation or intra-prediction and also produces decoded video for presentation on a display device (such as display device 32 of FIG. 1).

In this manner, video decoder 30 represents an example of a video coder configured to intra-predict a block of video data, using values of pixels along a primary boundary of the block, to form a predicted block, determine whether to filter the predicted block using data of a secondary boundary of the block, and filter the predicted block using data of the secondary boundary in response to determining to filter the predicted block.

FIG. 4 is a conceptual diagram illustrating various intra-prediction mode directions in HEVC. Intra-prediction modes are generally indicated using numeric identifiers in parentheses, as well as a relative offset from either vertical (v) or horizontal (h). In this example, mode (2) is skipped, as mode (2) generally corresponds to DC prediction mode, which is non-directional. Other non-directional intra-prediction modes, such as planar mode, are also omitted from FIG. 4.

In the example of FIG. 4, directional intra-prediction modes may be indicated as either relatively horizontal or relatively vertical. Modes indicated relative to horizontal (e.g., h+n, for n ∈ [0, 8]) are said to be relatively horizontal, while modes indicated relative to vertical (e.g., v+n, for n ∈ [0, 8]) are said to be relatively vertical, in this example. Other directional modes are considered relatively diagonal, and are represented by arrows having dashed lines. Such relatively diagonal intra-prediction modes include modes defined as h−n, for n ∈ [1, 7]) and v−n for n ∈ [1, 8]).

For directional intra-prediction modes (including relatively horizontal, relatively vertical, and relatively diagonal), the secondary boundary is defined as the top intra PU boundary in case of relatively horizontal modes (HOR to HOR+8) and for the relatively diagonal modes including modes (HOR−1 to HOR−7), and as the side (left) intra PU boundary for relatively vertical modes (VER to VER+8) and for the relatively diagonal modes including modes (VER−1 to VER−8). In general, comparisons of boundaries to each other or to pixels of a prediction unit, to determine whether to perform secondary boundary filtering, corresponds to analyzing data of boundaries between a current block and a neighboring, previously coded block, e.g., a block to the left of, or above, the current block.

Thus, references to boundary relationships should be understood to include mathematical relationships between two boundaries between a current block and neighboring, previously coded blocks, or to one of the two boundaries between the current block and neighboring, previously coded blocks and pixel values of the current block (e.g., pixel values of a PU of the current block). Such mathematical relationships may include, for example, Laplacian calculations and gradient difference calculations.

FIGS. 5A and 5B are conceptual diagrams illustrating computing of boundary relationships between reference boundary samples based on Laplacians. FIG. 5A illustrates block 100 including pixels 106A-106P (pixels 106). Block 100 neighbors a top-side boundary defined by pixels 104A-104D (pixels 104), and a left-side boundary defined by pixels 102A-102D. In this example, block 100 is a 4×4 block, meaning that block 100 has a height of 4 pixels and a width of 4 pixels. Pixels 106 can be referred to using coordinates (i, j), where i and j are in [0, 3]. Therefore, the height and width of block 100 can be represented by N, where N=3. In particular, the height and width of block 100 is N+1 (and, therefore, 4, in this example). Block 110 of FIG. 5B, similarly, includes pixels 116A-116P, and neighbors the top-side boundary defined by pixels 114A-114D (pixels 114) and the left-side boundary defined by pixels 112A-112D (pixels 112). Like block 100, block 110 of FIG. 5B is a 4×4 block.

Arrows in FIGS. 5A and 5B represent intra-prediction directions for blocks 100, 110. In these examples, block 100 is predicted using a relatively horizontal prediction direction, while block 110 is predicted using a relatively vertical prediction direction. Therefore, the primary boundary for block 100 is the left-side boundary defined by pixels 102, while the secondary boundary for block 100 is the top-side boundary defined by pixels 104. On the other hand, the primary boundary for block 110 is the top-side boundary defined by pixels 114, while the secondary boundary for block 110 is the left-side boundary defined by pixels 112.

The top reference boundary samples (defined by pixels 104 in FIG. 5A and pixels 114 in FIG. 5B) can also be denoted by TR[i] (i=0 . . . N), and the side reference boundary samples (pixels 102 in FIG. 5A and pixels 112 in FIG. 5B) by SR[i] (i=0 . . . N). In these examples, "boundary samples" are pixel values of boundaries of a current block, where the boundaries include pixels of neighboring, previously coded blocks, relative to the current block. The intra PU samples (that is, predicted pixel values of a PU, such as pixels 106 in FIG. 5A and pixels 116 in FIG. 5B) are denoted by P[k,l] (k,l=0 . . . N). The following pseudo-code illustrates example computations of the relationships between the reference boundary samples based on Laplacians in case of directional intra prediction modes:

```
IF (horizontal directional mode) THEN
    Value = MAX( | TR[N−2] −2*TR[N−1] + TR[N] |,
        | TR[N−3] −2*TR[N−2] + TR[N−1] | )
IF (vertical directional mode) THEN
    Value = MAX( | SR[N−2] −2*SR[N−1] + SR[N] |,
        | SR[N−3] −2*SR[N−2] + SR[N−1] | )
IF ( Value < Threshold ) THEN { Enable secondary boundary filtering
    technique } ELSE { Disable }
```

In this pseudo-code, the absolute values of Laplacians are computed for two adjacent reference boundary locations, namely centered around TR[N−1] and TR[N−2], or SR[N−1] and SR[N−2]. In general, the Laplacian can be computed for at least one location, and in case of multiple locations they can be sparsely distributed along the reference boundary locations or be adjacent. Furthermore, the technique can be extended from one to multiple reference boundary lines.

Thus, in the example of FIG. 5A, for block 100, a Laplacian value may be calculated as:

max(|pixel 104*B*−2*pixel 104*C*+pixel 104*D*|, |pixel 104*A*−2*pixel 104*B*+pixel 104*C*|).

Likewise, in the example of FIG. 5B, for block 110, a Laplacian value may be calculated as:

max(|pixel 112*B*−2*pixel 112*C*+pixel 112*D*|, |pixel 112*A*−2*pixel 112*B*+pixel 112*C*|).

In case of the non-directional DC and planar intra prediction modes, the "secondary" boundary may be defined by both the top and side (left) intra PU boundaries. The following pseudo-code illustrates an example solution:

```
IF (DC or Planar mode) THEN
        ValueT = MAX( | TR[N-2] -2*TR[N-1] + TR[N] |, | TR[N-3]
            -2*TR[N-2] + TR[N-1] | )
        ValueS = MAX( | SR[N-2] -2*SR[N-1] + SR[N] |, | SR[N-3]
            -2*SR[N-2] + SR[N-1] | )
        Value = MAX( ValueT, ValueS)
IF ( Value < Threshold ) THEN { Enable boundary filtering technique }
    ELSE { Disable }
```

An alternative mathematical relationship based on the gradient difference can be used. This is illustrated with the following pseudo-code for directional intra prediction modes:

```
IF (horizontal directional mode) THEN
        Value = MAX( |TR[N] − P[N,0]|, |TR[N-1] − P[N-1,0]|,
            |TR[N] − P[N-1,0]|, |TR[N-1] − P[N,0]| )
IF (vertical directional mode) THEN
        Value = MAX( |SR[N] − P[0,N]|, |SR[N-1] − P[0,N-1]|,
            |SR[N] − P[0,N-1]|, |SR[N-1] − P[0,N]| )
IF ( Value < Threshold ) THEN { Enable secondary boundary filtering
    technique } ELSE { Disable }
```

Analogous to the Laplacian based relationships, for the DC and planar intra modes, both boundaries can be processed together. In the general case, at least one gradient difference can be computed and in case of multiple gradient differences, they may be sparsely located along the intra PU boundaries, or adjacent to each other. Furthermore, the gradient difference can be extended to multiple reference boundary lines and to gradient differences between TR[i] and SR[i] samples. A further extension may be to include samples from the entire intra PU and the reference boundaries.

Furthermore, each secondary boundary filtering technique (filtering, gradient-based, bi-directional, etc.) may have its own dedicated protection logic and threshold values for enabling or disabling the technique. Each directional or non-directional intra prediction mode may have its own dedicated protection logic and threshold values for enabling or disabling an appropriate secondary boundary filtering technique. A table can be used to look-up what secondary boundary filtering technique to apply for each directional or non-directional intra prediction mode, together with threshold values (corresponding to appropriate protection logic) to enable or disable the secondary boundary filtering technique. Alternatively, this information can be signaled to the decoder by the encoder (e.g., to video decoder 30 by video encoder 20). Thus, the encoder may, in various examples, signal to the decoder whether to perform secondary boundary filtering or criteria for determining whether to perform secondary boundary filtering. In still other examples, the video decoder may be configured a priori with criteria for determining whether to perform secondary boundary filtering.

Figure 6:
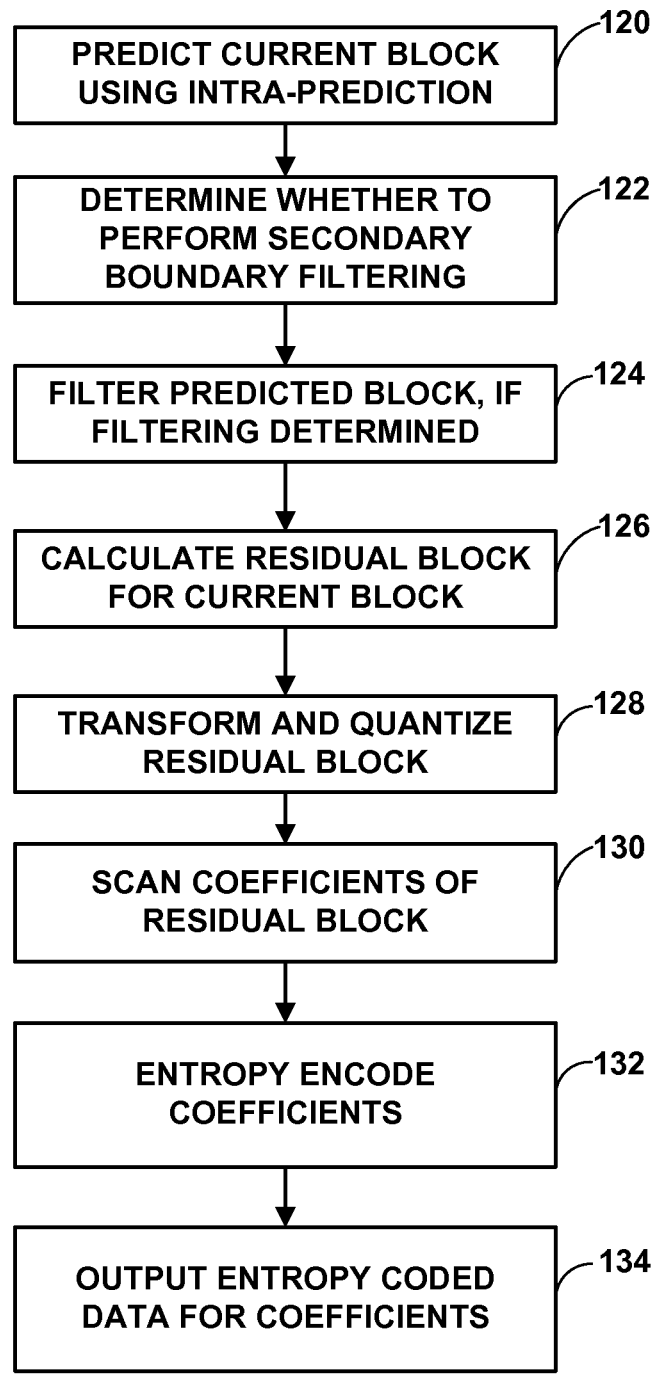
FIG. 6 is a flowchart illustrating an example method for encoding a current block.

FIG. 6 is a flowchart illustrating an example method for encoding a current block. The current block may comprise a current CU or a portion of the current CU. Although described with respect to video encoder 20 (FIGS. 1 and 2), it should be understood that other devices may be configured to perform a method similar to that of FIG. 6.

In this example, video encoder 20 initially predicts the current block using intra-prediction (120). For example, video encoder 20 may calculate one or more prediction units (PUs) for the current block. In accordance with the techniques of this disclosure, video encoder 20 may predict the current block using an intra-prediction mode, e.g., a relatively horizontal or relatively vertical intra-prediction mode. In some examples, video encoder 20 may predict the current block using a relatively diagonal intra-prediction mode or a non-directional intra-prediction mode, such as DC or planar mode.

Video encoder 20 may then determine whether to perform secondary boundary filtering (122). An example method for determining whether to perform secondary boundary filtering is described in greater detail below with respect to FIG. 8. Video encoder 20 may then filter the predicted block, if secondary boundary filtering is determined (124). That is, intra-prediction unit 46 may form a predicted block, and filtering unit 66 (FIG. 2) may filter values of the predicted block using values of pixels along a secondary boundary.

Video encoder 20 may then calculate a residual block for the current block, e.g., to produce a transform unit (TU) (126). To calculate the residual block, video encoder 20 may calculate a difference between the original, uncoded block and the predicted block for the current block. In particular, in accordance with the techniques of this disclosure, video encoder 20 may calculate the residual block as a difference between the original block and the predicted block when secondary boundary filtering is not determined, and as a difference between the original block and the filtered predicted block when secondary boundary filtering is determined.

Video encoder 20 may then transform and quantize coefficients of the residual block (128). Next, video encoder 20 may scan the quantized transform coefficients of the residual block (130). During the scan, or following the scan, video encoder 20 may entropy encode the coefficients (132). For example, video encoder 20 may encode the coefficients using CAVLC or CABAC. Video encoder 20 may then output the entropy coded data of the block (134).

In this manner, the method of FIG. 6 represents an example of a method including intra-predicting a block of video data, using values of pixels along a primary boundary of the block, to form a predicted block, determining whether to filter the predicted block using data of a secondary boundary of the block, and filtering the predicted block using data of the secondary boundary in response to determining to filter the predicted block.

Figure 7:
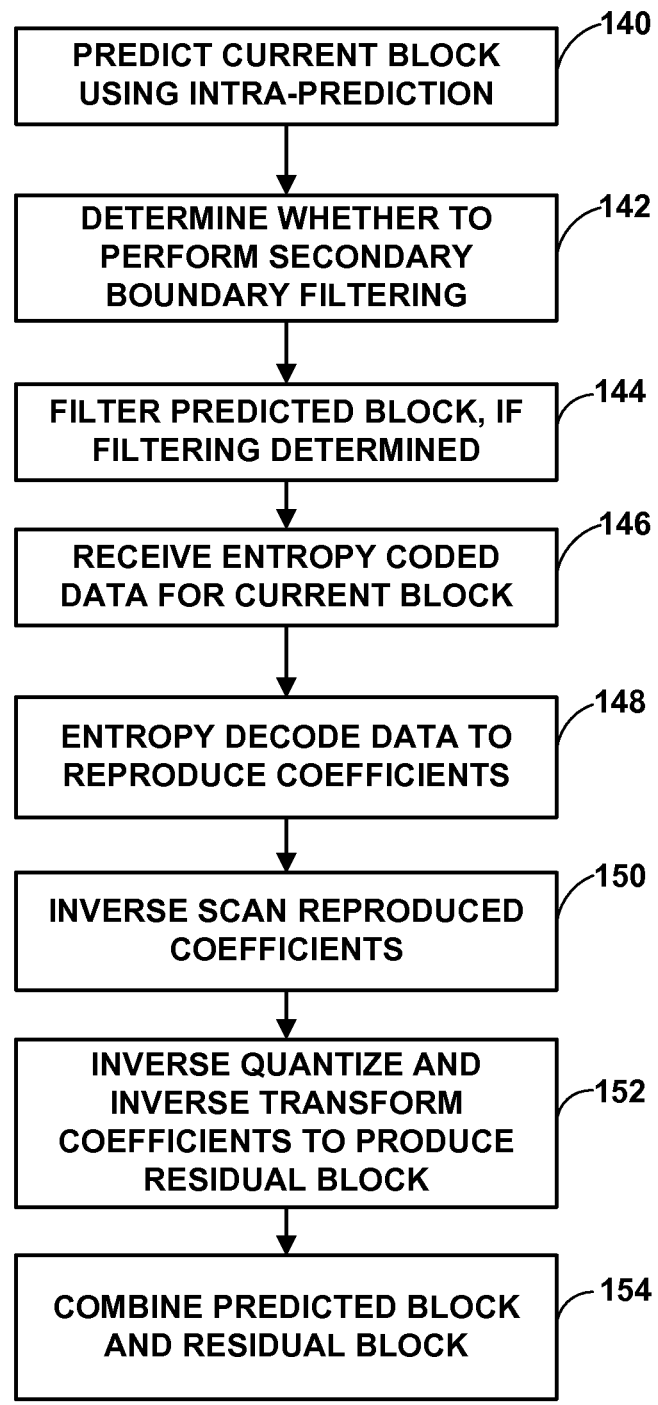
FIG. 7 is a flowchart illustrating an example method for decoding a current block of video data.

FIG. 7 is a flowchart illustrating an example method for decoding a current block of video data. The current block may comprise a current CU or a portion of the current CU. Although described with respect to video decoder 30 (FIGS. 1 and 3), it should be understood that other devices may be configured to perform a method similar to that of FIG. 7.

Video decoder 30 may predict the current block using intra-prediction (140), to calculate a predicted block for the current block. For example, video decoder 30 may calculate one or more prediction units (PUs) for the current block. In particular, video decoder 30 may entropy decode an intra-prediction mode indication for the current block. In accordance with the techniques of this disclosure, video decoder 30 may predict the current block using an intra-prediction mode, e.g., a relatively horizontal or relatively vertical intra-prediction mode. In some examples, video decoder 30 may predict the current block using a relatively diagonal intra-prediction mode or a non-directional intra-prediction mode, such as DC or planar mode.

Video decoder 30 may then determine whether to perform secondary boundary filtering (142). An example method for determining whether to perform secondary boundary filtering is described in greater detail below with respect to FIG. 8.

Video decoder 30 may then filter the predicted block, if secondary boundary filtering is determined (144). That is, intra-prediction unit 74 may form a predicted block, and filtering unit 84 (FIG. 3) may filter values of the predicted block using values of pixels along a secondary boundary.

Video decoder 30 may also receive entropy coded data for the current block, such as entropy coded data for coefficients of a residual block corresponding to the current block (146). Video decoder 30 may entropy decode the entropy coded data to reproduce coefficients of the residual block (148). Video decoder 30 may then inverse scan the reproduced coefficients (150), to create a block of quantized transform coefficients. Video decoder 30 may then inverse quantize and inverse transform the coefficients to produce a residual block (152). Video decoder 30 may ultimately decode the current block by combining the predicted block and the residual block (154). In particular, video decoder 30 may combine the residual block with the predicted block when secondary boundary filtering is not determined. On the other hand, when secondary boundary filtering is determined, video decoder 30 may combine the residual block with the filtered predicted block.

In this manner, the method of FIG. 7 represents an example of a method including intra-predicting a block of video data, using values of pixels along a primary boundary of the block, to form a predicted block, determining whether to filter the predicted block using data of a secondary boundary of the block, and filtering the predicted block using data of the secondary boundary in response to determining to filter the predicted block.

Figure 8:
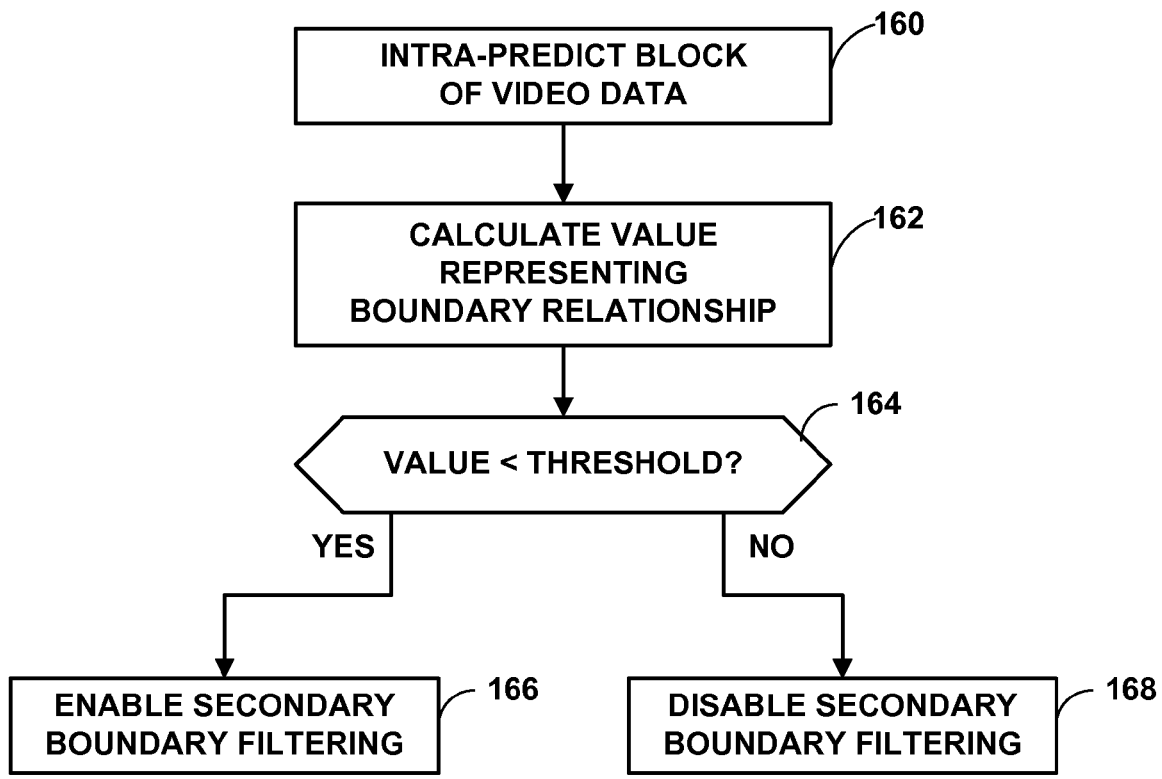
FIG. 8 is a flowchart illustrating an example method for determining whether to perform secondary boundary filtering in accordance with the techniques of this disclosure.

FIG. 8 is a flowchart illustrating an example method for determining whether to perform secondary boundary filtering in accordance with the techniques of this disclosure. The method of FIG. 8 may be performed by video encoder 20 (e.g., intra-prediction unit 46) and/or video decoder 30 (e.g., intra-prediction unit 74), or other video data processing devices. For purposes of example, the method of FIG. 8 is described with respect to video encoder 20, though it should be understood that a similar method may be performed by video decoder 30. In some examples, steps 162-168 of the method of FIG. 8 may correspond to step 122 of the method of FIG. 6 and to step 142 of the method of FIG. 7.

Initially, video encoder 20 may intra-predict a block of video data (160). For example, video encoder 20 may select an intra-mode to use to encode a block of video data, then subsequently decode the intra-coded block of video data. Video decoder 30 may, when performing the method of FIG. 8, decode a coded block of video data using an intra-mode indicated by received syntax information.

After predicting an intra-coded block of video data, video encoder 20 may calculate a value representing a boundary relationship for the block (162). The boundary relationship may include a mathematical relationship between one boundary and another (e.g., a top-side boundary and a left-side boundary), or a boundary and intra PU samples. In some examples, the boundary relationship may comprise a Laplacian value, while in other examples, the boundary relationship may be based on a gradient difference.

For example, if the block was predicted using a relatively horizontal directional intra-prediction mode, video encoder 20 may calculate a Laplacian value from values of pixels in a top-neighboring block. As illustrated in and discussed with respect to FIG. 5A, for example, video encoder 20 may calculate the Laplacian value as the max of $|TR[N-2]-2*TR[N-1]+TR[N]|$ and $|TR[N-3]-2*TR[N-2]+TR[N-1]|$. As another example, if the block was predicted using a relatively vertical intra-prediction mode, video encoder 20 may calculate a Laplacian value from values of pixels in a left-neighboring block. As illustrated in and discussed with respect to FIG. 5B, for example, video encoder 20 may calculate the Laplacian value as the max of $|SR[N-2]-2*SR[N-1]+SR[N]|$ and $|SR[N-3]-2*SR[N-2]+SR[N-1]|$.

As still another example, the block may have been predicted using a non-directional intra-prediction mode, such as DC or Planar mode. In some examples, when the block is intra-predicted using a non-directional mode, video encoder 20 may calculate the Laplacian value as the max of $|TR[N-2]-2*TR[N-1]+TR[N]|$, $|TR[N-3]-2*TR[N-2]+TR[N-1]|$, $|SR[N-2]-2*SR[N-1]+SR[N]|$ and $|SR[N-3]-2*SR[N-2]+SR[N-1]|$.

In other examples, video encoder 20 may calculate a mathematical relationship based on gradient differences as the boundary relationship. For example, video encoder 20 may calculate a gradient difference value as the max of $|TR[N]-P[N,0]|$, $|TR[N-1]-P[N-1,0]|$, $|TR[N]-P[N-1,0]|$, and $|TR[N-1]-P[N,0]|$ for relatively horizontal directional modes, or the max of $|SR[N]-P[0,N]|$, $|SR[N-1]-P[0,N-1]|$, $|SR[N]-P[0,N-1]|$, and $|SR[N-1]-P[0,N]|$ for relatively vertical directional modes. Video encoder 20 may also be configured to calculate gradient difference values for non-directional modes, in a manner that is substantially analogous to the Laplacian values for non-directional modes.

After calculating the value representative of the boundary relationship (also referred to herein as a boundary relationship value), video encoder 20 may determine whether the value is less than a threshold (164). If the value is less than the threshold ("YES" branch of 164), video encoder 20 may enable secondary boundary filtering (166). On the other hand, if the value is not less than (e.g., equal to or greater than) the threshold ("NO" branch of 164), video encoder 20 may disable secondary boundary filtering (168). The value being greater than or equal to the threshold may indicate that BD-rate will be degraded if secondary boundary filtering is enabled. In this manner, video encoder 20 and/or video decoder 30 may determine whether to enable or disable secondary boundary filtering for an intra-predicted block of video data.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium.

For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

The invention claimed is:

1. A method of decoding video data, the method comprising:
   intra-predicting a current block of video data, using values of pixels along a primary boundary of the current block, to form a predicted block;
   determining whether to filter the predicted block using data of a secondary boundary of the current block, wherein the secondary boundary is perpendicular to the primary boundary;
   in response to determining to filter the predicted block:
      prior to decoding the current block, filtering the predicted block using data of the secondary boundary;
      decoding a residual block for the current block; and
      combining the residual block with the filtered predicted block to produce a decoded block for the current block.

2. The method of claim 1, wherein determining whether to filter the predicted block using the data of the secondary boundary comprises calculating a value representing a boundary relationship.

3. The method of claim 2, wherein determining whether to filter the predicted block comprises determining whether to filter the predicted block based on a comparison of the calculated value to a threshold.

4. The method of claim 2, wherein the value represents a relationship between pixel values of one or more pixels of the primary boundary and pixel values of one or more pixels of the secondary boundary.

5. The method of claim 2, wherein the value represents a relationship between pixel values of one or more pixels of at least one of the primary boundary or the secondary boundary and pixel values of one or more pixels of the predicted block.

6. The method of claim 2, wherein calculating the value comprises calculating a Laplacian value.

7. The method of claim 6, wherein intra-predicting the current block comprises predicting the current block using a relatively horizontal intra-prediction mode, wherein calculating the Laplacian value comprises calculating a max of $|TR[N-2]-2*TR[N-1]+TR[N]|$ and $|TR[N-3]-2*TR[N-2]+TR[N-1]|$, wherein the secondary boundary comprises a top-side boundary, wherein TR[k] corresponds to the $k^{th}$ pixel along the top boundary starting from the left edge of the current block, and wherein N is an integer value representing a width of the current block.

8. The method of claim 6, wherein intra-predicting the current block comprises predicting the current block using a relatively vertical intra-prediction mode, and wherein calculating the Laplacian value comprises calculating a max $|SR[N-2]-2*SR[N-1]+SR[N]|$ and $|SR[N-3]-2*SR[N-2]+SR[N-1]|$, wherein the secondary boundary comprises a left-side boundary, wherein SR[j] corresponds to the $j^{th}$ pixel along the left side boundary starting from the top edge of the current block, and wherein N is an integer value representing a height of the current block.

9. The method of claim 6, wherein intra-predicting the current block comprises predicting the current block using a non-directional intra-prediction mode, and wherein calculating the Laplacian value comprises calculating a max of $|TR[N-2]-2*TR[N-1]+TR[N]|$, $|TR[N-3]-2*TR[N-2]+TR[N-1]|$, $|SR[N-2]-2*SR[N-1]+SR[N]|$, and $|SR[N-3]-2*SR[N-2]+SR[N-1]|$, wherein TR[k] corresponds to the $k^{th}$ pixel along a top-side boundary starting from the left edge of the current block, wherein SR[j] corresponds to the $j^{th}$ pixel along a left side boundary starting from the top edge of the current block, wherein the current block comprises a square block, and wherein N is an integer value representing a width and a height of the current block.

10. The method of claim 9, wherein intra-predicting the current block using a non-directional intra-prediction mode comprises predicting the current block using one of DC mode and Planar mode.

11. The method of claim 2, wherein calculating the value comprises calculating a gradient difference value.

12. The method of claim 11, wherein intra-predicting the current block comprises predicting the current block using a relatively horizontal intra-prediction mode, wherein calculating the gradient difference value comprises calculating a max of $|TR[N]-P[N,0]|$, $|TR[N-1]-P[N-1,0]|$, $|TR[N]-P[N-1,0]|$, and $|TR[N-1]-P[N,0]|$, wherein the secondary boundary comprises a top-side boundary, wherein TR[k] corresponds to the $k^{th}$ pixel along the top boundary starting from the left edge of the current block, wherein N is an integer value representing a width of the current block, and wherein P[i,j] corresponds to the pixel of the predicted block at position [i,j].

13. The method of claim 11, intra-predicting the current block comprises predicting the current block using a relatively vertical intra-prediction mode, wherein calculating the gradient difference value comprises calculating a max of |SR[N]−P[0,N]|, |SR[N−1]−P[0,N−1]|, |SR[N]−P[0,N−1]|, and |SR[N−1]−P[0,N]|, wherein SR[j] corresponds to the $j^{th}$ pixel along the left-side boundary starting from the top edge of the current block, wherein N is an integer value representing a height of the current block, and wherein P[i,j] corresponds to the pixel of the predicted block at position [i,j].

14. The method of claim 1, further comprising:
combining the predicted block, without filtering the predicted block, with the residual block to form the decoded block for the current block in response to determining not to filter the predicted block.

15. The method of claim 1, wherein the residual block comprises an encoded residual block, further comprising, prior to decoding the encoded residual block:
selecting an intra-prediction mode to use for the current block, wherein intra-predicting comprises intra-predicting the current block using the selected intra-prediction mode;
calculating a residual block comprising residual values representing differences between the current block and the predicted block in response to determining not to filter the predicted block;
calculating the residual block comprising residual values representing differences between the current block and the filtered predicted block in response to determining to filter the predicted block; and
encoding the residual block to form the encoded residual block.

16. The method of claim 1, further comprising coding syntax information representative of whether to filter the predicted block using data of the secondary boundary.

17. A device for decoding video data, the device comprising:
a memory configured to store video data; and
a video coder configured to:
intra-predict a current block of the video data, using values of pixels along a primary boundary of the current block, to form a predicted block,
determine whether to filter the predicted block using data of a secondary boundary of the current block, wherein the secondary boundary is perpendicular to the primary boundary,
in response to determining to filter the predicted block:
prior to decoding the current block, filter the predicted block using data of the secondary boundary;
decode a residual block for the current block; and
combine the residual block with the filtered predicted block to produce a decoded block for the current block.

18. The device of claim 17, wherein to determine whether to filter the predicted block using the data of the secondary boundary, the video coder is configured to calculate a value representing a boundary relationship.

19. The device of claim 18, wherein the video coder is configured to determine whether to filter the predicted block based on a comparison of the calculated value to a threshold.

20. The device of claim 18, wherein the value represents one of a relationship between pixel values of one or more pixels of the primary boundary and pixel values of one or more pixels of the secondary boundary, and a relationship between pixel values of one or more pixels of at least one of the primary boundary or the secondary boundary and pixel values of one or more pixels of the predicted block.

21. The device of claim 17, wherein to calculate the value, the video coder is configured to calculate a Laplacian value.

22. The device of claim 17, wherein to calculate the value, the video coder is configured to calculate a gradient difference value.

23. The device of claim 17, wherein the video coder is further configured to combine the predicted block, without filtering the predicted block, with the residual block to form the decoded block for the current block in response to determining not to filter the predicted block.

24. A device for coding video data, the device comprising:
means for intra-predicting a current block of video data, using values of pixels along a primary boundary of the current block, to form a predicted block;
means for determining whether to filter the predicted block using data of a secondary boundary of the current block, wherein the secondary boundary is perpendicular to the primary boundary;
means for filtering, prior to decoding the current block, the predicted block using data of the secondary boundary in response to determining to filter the predicted block;
means for decoding a residual block for the current block in response to determining to filter the predicted block; and
means for combining the residual block with the filtered predicted block to produce a decoded block for the current block in response to determining to filter the predicted block.

25. The device of claim 24, wherein the means for determining whether to filter the predicted block using the data of the secondary boundary comprises means for calculating a value representing a boundary relationship.

26. The device of claim 25, wherein the means for determining whether to filter the predicted block comprises means for determining whether to filter the predicted block based on a comparison of the calculated value to a threshold.

27. The device of claim 25, wherein the value represents one of a relationship between pixel values of one or more pixels of the primary boundary and pixel values of one or more pixels of the secondary boundary, and a relationship between pixel values of one or more pixels of at least one of the primary boundary or the secondary boundary and pixel values of one or more pixels of the predicted block.

28. The device of claim 24, wherein the means for calculating the value comprises means for calculating a Laplacian value.

29. The device of claim 24, wherein the means for calculating the value comprises means for calculating a gradient difference value.

30. The device of claim 24, further comprising:
means for combining the predicted block, without filtering the predicted block, with the residual block to form the decoded block for the current block in response to determining not to filter the predicted block.

31. A non-transitory computer-readable storage medium having stored thereon instructions that, when executed, cause a processor to:
intra-predict a current block of video data, using values of pixels along a primary boundary of the current block, to form a predicted block;
determine whether to filter the predicted block using data of a secondary boundary of the current block, wherein the secondary boundary is perpendicular to the primary boundary;
in response to determining to filter the predicted block:
prior to decoding the current block, filter the predicted block using data of the secondary boundary;
decode a residual block for the current block; and combine the residual block with the filtered predicted block to produce a decoded block for the current block.

32. The non-transitory computer-readable storage medium of claim 31, wherein the instructions that cause the processor to determine whether to filter the predicted block using the data of the secondary boundary comprise instructions that cause the processor to calculate a value representing a boundary relationship.

33. The non-transitory computer-readable storage medium of claim 32, wherein the instructions that cause the processor to determine whether to filter the predicted block comprise instructions that cause the processor to determine whether to filter the predicted block based on a comparison of the calculated value to a threshold.

34. The non-transitory computer-readable storage medium of claim 32, wherein the value represents one of a relationship between pixel values of one or more pixels of the primary boundary and pixel values of one or more pixels of the secondary boundary, and a relationship between pixel values of one or more pixels of at least one of the primary boundary or the secondary boundary and pixel values of one or more pixels of the predicted block.

35. The non-transitory computer-readable storage medium of claim 31, wherein the instructions that cause the processor to calculate the value comprise instructions that cause the processor to calculate a Laplacian value.

36. The non-transitory computer-readable storage medium of claim 31, wherein the instructions that cause the processor to calculate the value comprise instructions that cause the processor to calculate a gradient difference value.

37. The non-transitory computer-readable storage medium of claim 31, further comprising instructions that cause the processor to:
  combine the predicted block, without filtering the predicted block, with the residual block to form the decoded block for the current block in response to determining not to filter the predicted block.

* * * * *